United States Patent [19]
Emo et al.

[11] Patent Number: 6,005,725
[45] Date of Patent: *Dec. 21, 1999

[54] VARIABLE ZONE LAYOUT AND TRACK PITCH PARAMETER CONSIDERATIONS FOR INFORMATION STORAGE DISK DRIVE

[75] Inventors: Bruce D. Emo, Boulder; Brian D. Wilson, Louisville, both of Colo.

[73] Assignee: Mobile Storage Technology Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/824,127

[22] Filed: Mar. 26, 1997

Related U.S. Application Data

[60] Division of application No. 08/538,622, Nov. 2, 1995, abandoned, which is a continuation-in-part of application No. 08/359,111, Dec. 19, 1994, Pat. No. 5,596,458.

[51] Int. Cl.$^6$ .............................. G11B 27/36; G11B 5/23
[52] U.S. Cl. ............................................. 360/31; 360/119
[58] Field of Search ................................. 360/31, 48, 65, 360/121, 119; 369/48

[56] References Cited

U.S. PATENT DOCUMENTS 3,299,581  1/1967  Price et al. .
3,531,788  9/1970  Brown et al. .

(List continued on next page.)

FOREIGN PATENT DOCUMENTS

| 98 580 | 11/1983 | Japan . |
|---|---|---|
| 59-77685 | 5/1984 | Japan . |
| 17281 | 1/1986 | Japan . |
| 61-2161179 | 9/1986 | Japan . |
| WO 91/02349 | 2/1991 | WIPO . |
| WO 91/02354 | 2/1991 | WIPO . |

OTHER PUBLICATIONS

Quantum Corporation, *Technical Highlights*: Go–Drive Series, Sep. 1990, pp. 1–5 and 3 unnumbered pages.
Quantum Corporation, "*Quantum Low Power Products...*" Sep., 1990, pp. 1–5.
Quantum Corporation, "*Quantum Go Drive Series*," comprising 3 unnumbered pages, date and place of publication unknown.
LaPine Technology Disk Drive, Photocopy of best available photograph, marked as Item 15.
Prairie Tek Corporation rigid disk drive model 120, photocopies of two photographs (labelled 16a and 16b), drawing (16C) and Brochu.

*Primary Examiner*—Paul W. Huber
*Assistant Examiner*—Regina Y. Neal
*Attorney, Agent, or Firm*—Skjerven, Morrill, MacPherson, Franklin & Friel LLP; David W. Heid; Carmen C. Cook

[57] ABSTRACT

A magnetic recording system utilizing a plurality of surfaces on a magnetic recording disk with recording zone boundaries established on the respective surfaces of the disk based on performance characteristics of the read/write transducer associated with the surface. The performance of the read/write transducer from the aspects of the width of the track written by the transducers as well as the recording performance at the expected recording frequency, are both utilized in building disk drives. Since the zone boundaries are established uniquely for the performance of each transducer, rather than by defining the boundaries of all zones for all surfaces in advance based on assumed performance characteristics of the heads, the zone boundaries on one surface of the disk will not necessarily align with the zone boundaries on another surface of the disk. Similarly, when a plurality of disks are utilized, the zone boundaries will not necessarily be aligned. Improved utilization of the available stroke on the disk drive permits further improvement in recording density. A magnetic recording system utilizing track pitch based on a track width characteristic of the read/write transducer used in the system.

13 Claims, 31 Drawing Sheets

U.S. PATENT DOCUMENTS

| | | |
|---|---|---|
| 3,577,133 | 5/1971 | Garfein et al. . |
| 3,984,873 | 10/1976 | Pejcha . |
| 4,125,883 | 11/1978 | Rolph . |
| 4,138,741 | 2/1979 | Hedlund et al. . |
| 4,164,763 | 8/1979 | Briccetti et al. . |
| 4,297,737 | 10/1981 | Andresen et al. . |
| 4,379,316 | 4/1983 | Krane . |
| 4,396,960 | 8/1983 | Matla et al. . |
| 4,409,629 | 10/1983 | Puls . |
| 4,413,251 | 11/1983 | Adler et al. . |
| 4,420,830 | 12/1983 | Green . |
| 4,424,543 | 1/1984 | Lewis et al. . |
| 4,443,874 | 4/1984 | Steenberg . |
| 4,473,153 | 9/1984 | Colangelo . |
| 4,495,533 | 1/1985 | Chambers . |
| 4,497,003 | 1/1985 | Abe et al. . |
| 4,502,136 | 2/1985 | Rickert et al. . |
| 4,510,592 | 4/1985 | Kanamaru et al. . |
| 4,515,272 | 5/1985 | Newhouse . |
| 4,516,177 | 5/1985 | Moon et al. . |
| 4,518,904 | 5/1985 | MacLeod et al. . |
| 4,530,018 | 7/1985 | Hoshino et al. . |
| 4,530,019 | 7/1985 | Penniman . |
| 4,530,020 | 7/1985 | Sutton . |
| 4,535,374 | 8/1985 | Anderson et al. . |
| 4,539,614 | 9/1985 | Thompson . |
| 4,568,988 | 2/1986 | McGinlay et al. . |
| 4,568,994 | 2/1986 | Lynch . |
| 4,578,723 | 3/1986 | Betts . |
| 4,594,622 | 6/1986 | Wallis . |
| 4,627,288 | 12/1986 | Guzik et al. . |
| 4,628,379 | 12/1986 | Andrews . |
| 4,630,190 | 12/1986 | Alaimo et al. . |
| 4,631,606 | 12/1986 | Sugaya . |
| 4,638,383 | 1/1987 | McGinlay et al. . |
| 4,641,294 | 2/1987 | Yoshimaru . |
| 4,647,997 | 3/1987 | Westwood . |
| 4,649,531 | 3/1987 | Horowitz et al. . |
| 4,655,348 | 4/1987 | Takagi . |
| 4,658,308 | 4/1987 | Sander, Jr. . |
| 4,663,682 | 5/1987 | McNeil . |
| 4,669,004 | 5/1987 | Moon et al. . |
| 4,679,102 | 7/1987 | Wevers et al. . |
| 4,683,506 | 7/1987 | Toldi et al. . |
| 4,703,371 | 10/1987 | Redmond et al. . |
| 4,705,279 | 11/1987 | Mizukami et al. . |
| 4,714,967 | 12/1987 | Bizjak . |
| 4,716,480 | 12/1987 | Wiens et al. . |
| 4,724,501 | 2/1988 | Buchwald et al. . |
| 4,725,907 | 2/1988 | Jue . |
| 4,734,813 | 3/1988 | Bessho . |
| 4,736,358 | 4/1988 | Hoshi et al. . |
| 4,747,002 | 5/1988 | Takikawa et al. . |
| 4,750,059 | 6/1988 | Syracuse . |
| 4,752,848 | 6/1988 | Garcia et al. . |
| 4,755,981 | 7/1988 | Ekhoff . |
| 4,760,477 | 7/1988 | Takikawa . |
| 4,772,972 | 9/1988 | Maeda . |
| 4,772,974 | 9/1988 | Moon et al. . |
| 4,780,866 | 10/1988 | Syracuse . |
| 4,783,705 | 11/1988 | Moon et al. . |
| 4,786,995 | 11/1988 | Stupeck et al. . |
| 4,789,975 | 12/1988 | Taniyama . |
| 4,799,112 | 1/1989 | Bremmer et al. . |
| 4,799,209 | 1/1989 | Grobben . |
| 4,803,580 | 2/1989 | Mowry . |
| 4,805,051 | 2/1989 | DeMarco et al. ........................ 360/121 |
| 4,819,103 | 4/1989 | Okamura . |
| 4,823,212 | 4/1989 | Knowles et al. . |
| 4,824,059 | 4/1989 | Butler . |
| 4,825,310 | 4/1989 | Song . |
| 4,825,321 | 4/1989 | Hassel et al. . |
| 4,827,364 | 5/1989 | Sheriff . |
| 4,829,501 | 5/1989 | Seto et al. . |
| 4,833,665 | 5/1989 | Tokumitsu et al. . |
| 4,839,756 | 6/1989 | Chew et al. . |
| 4,841,517 | 6/1989 | Kurihara et al. . |
| 4,858,034 | 8/1989 | Hassel et al. . |
| 4,864,443 | 9/1989 | Peterson . |
| 4,870,703 | 9/1989 | Augeri et al. . |
| 4,873,679 | 10/1989 | Murai et al. . |
| 4,876,618 | 10/1989 | Ide et al. . |
| 4,894,734 | 1/1990 | Fischler et al. . |
| 4,901,173 | 2/1990 | Jones et al. . |
| 4,907,214 | 3/1990 | Nagano et al. . |
| 4,920,437 | 4/1990 | Washo et al. . |
| 4,920,462 | 4/1990 | Couse et al. . |
| 4,920,528 | 4/1990 | Sakamoto et al. . |
| 4,933,785 | 6/1990 | Morehouse et al. . |
| 4,943,748 | 7/1990 | Shiozawa . |
| 4,945,311 | 7/1990 | Smith . |
| 4,949,036 | 8/1990 | Bezinque et al. ..................... 360/31 X |
| 4,958,839 | 9/1990 | Guzik et al. . |
| 4,965,684 | 10/1990 | Stefansky . |
| 4,969,059 | 11/1990 | Volz et al. . |
| 4,977,472 | 12/1990 | Volz et al. . |
| 4,979,055 | 12/1990 | Squires et al. . |
| 4,979,056 | 12/1990 | Squires et al. . |
| 4,984,100 | 1/1991 | Takayama et al. . |
| 4,984,101 | 1/1991 | Kanota et al. ........................... 360/65 |
| 4,984,230 | 1/1991 | Satoh et al. . |
| 4,996,617 | 2/1991 | Yaeger et al. . |
| 4,999,720 | 3/1991 | Wilson et al. . |
| 5,001,700 | 3/1991 | Rowden et al. . |
| 5,014,142 | 5/1991 | Nakanishi et al. . |
| 5,023,736 | 6/1991 | Kelsic et al. . |
| 5,023,737 | 6/1991 | Yaeger . |
| 5,023,857 | 6/1991 | Verboom . |
| 5,025,335 | 6/1991 | Stefansky . |
| 5,025,336 | 6/1991 | Morehouse et al. . |
| 5,027,241 | 6/1991 | Hatch et al. . |
| 5,034,837 | 7/1991 | Schmitz . |
| 5,036,416 | 7/1991 | Mastache . |
| 5,041,924 | 8/1991 | Blackborow et al. . |
| 5,041,926 | 8/1991 | Ockerse et al. . |
| 5,050,016 | 9/1991 | Squires . |
| 5,072,318 | 12/1991 | Yu . |
| 5,075,804 | 12/1991 | Deyring . |
| 5,170,299 | 12/1992 | Moon . |
| 5,182,682 | 1/1993 | Weispfenning et al. . |
| 5,189,576 | 2/1993 | Morehouse et al. . |
| 5,212,604 | 5/1993 | Ogura et al. . |
| 5,218,253 | 6/1993 | Morehouse et al. . |
| 5,235,585 | 8/1993 | Bish et al. . |
| 5,237,472 | 8/1993 | Morehouse et al. . |
| 5,237,553 | 8/1993 | Fukushima et al. . |
| 5,257,143 | 10/1993 | Zangenehpour . |
| 5,264,975 | 11/1993 | Bajorek et al. . |
| 5,319,627 | 6/1994 | Shinno et al. . |
| 5,321,560 | 6/1994 | Cowen . |
| 5,339,207 | 8/1994 | Moon et al. . |
| 5,384,671 | 1/1995 | Fisher . |
| 5,537,264 | 7/1996 | Pinteric ................................. 360/31 |
| 5,537,277 | 7/1996 | Kato . |
| 5,596,458 | 1/1997 | Emo et al. . |
| 5,636,075 | 6/1997 | Nishimura et al. .................. 360/48 |
| 5,657,176 | 8/1997 | Moribe et al. ........................ 360/31 |
| 5,796,543 | 8/1998 | Ton-That ........................ 360/77.08 |
| B1 4,568,988 | 11/1988 | McGinlay et al. . |
| B1 4,638,383 | 11/1988 | McGinlay et al. . |

| HEAD HD#4 | | HEAD HD#1 | |
|---|---|---|---|
| START TRACK | ZONE | START TRACK | ZONE |
| 0 | 7 | 0 | 6 |
| 150 | 6 | 120 | 5 |
| 300 | 5 | 280 | 4 |
| 450 | 4 | 400 | 3 |
| 800 | 3 | 600 | 2 |
|  |  | 900 | 1 |

VARIABLE ZONE LAYOUT AND TRACK PITCH PARAMETER CONSIDERATIONS FOR INFORMATION STORAGE DISK DRIVE

CROSS-REFERENCE TO RELATED APPLICATIONS

This application is a division of application Ser. No. 08/538,622, filed Nov. 2, 1995, now abandoned, which is a continuation-in-part of application Ser. No. 08/359,111, filed Dec. 19, 1994, now U.S. Pat. No. 5,596,458, issued Jan. 21, 1997.

BACKGROUND OF THE INVENTION

1. Field of the Invention

This invention relates to the storage of information on magnetic media, and more particularly to storage of information on rotating magnetic media, for example rotating disks in a disk drive.

2. Description of the Prior Art

Disk drives in the prior art have utilized circular tracks for recording of information on disks having a magnetic coating on the surface. When a plurality of disks are utilized, an assemblage of sequentially or simultaneously addressable tracks is known as a cylinder. It is a goal of disk drive designers to provide as much storage capacity as possible. For a given physical structure, this has typically been accomplished by either increasing the amount of data recorded on a track, or increasing the number of tracks. Disk drives of the prior art design have always used a fixed number of tracks (and cylinders) to obtain a maximum storage capacity.

In the prior art, the surfaces of each disk have been divided into recording zones and zone bit recording techniques utilized such that the zones on each disk surface align vertically. For example, U.S. Pat. No. 4,799,112 to Bremmer et al. describes what is known in the industry as zone bit recording. In this technique, zones are defined on the disk surface and the frequency of recording within a zone is maintained constant. Zone density recording is a piece-wise linear implementation of constant density recording. A specified read/write frequency is different, however, from one zone to another. Referring to FIG. 1 of this application, a highly simplified drawing of a pair of disks 1 and 2 in a disk stack (shown as a cross-sectional-view of these disks) illustrates the recording zones on the disks defined as Z1, Z2 and Z3. As illustrated in FIG. 1 by the dashed lines, the zones on the two-disk stack are vertically aligned and the boundaries of the zones defined radially by the distances indicated by R1–R4 based on the distance from center C of the disk. It will be noted that in the stack the centerline C of the disks are aligned. The read/write frequency used in the corresponding zone of each disk is the same. Thus the read/write frequency in zone Z1 of disk 1 is the same as that used zone Z1 of disk 2 and so on. The recording frequency utilized within each of the zones is determined at the design stage based on various factors, including an expected nominal head read/write performance for the heads to be used in the drive. Based on the expected performance level of read/write heads, a recording frequency was set within each zone to deliver the desired storage capacity for the drive and the number of tracks for each zone was set by other considerations to be discussed later.

The layout of the zones was also based on a consideration of the physical dimensions of the drive in terms of stroke (which will be described in more detail below), the worst case head performance, flying height performance, zone efficiency and the desired yield of drives based on their performance after assembly. With regard to head performance, that is, defined in the art on the basis of head performance at a given frequency in terms of the offtrack bit error rate. The offtrack bit error rate is defined as the number of bits transferred per bit in error when data is read at a predetermined offset, in the case described herein at a position 10% off track. Referring to FIG. 2, a graphical illustration is provided of the performance curve of a typical head. The read/write frequency (which is the NRZ frequency) is plotted along the X axis, and on the Y axis the log of the offtrack bit error rate, abbreviated herein as LOBER. In FIG. 2, $f_R$ is the typical average operating frequency of a head, which may be for example about 20 MHz. The disk drive designer defines a minimum offtrack bit error rate threshold, which in FIG. 2 is indicated by the dashed line TH. In the plot illustrated in FIG. 2, the minimum acceptable log offtrack bit error rate TH is equal to 6 (i.e. one bit in error for $10^6$ bits transferred, this number being used for illustrative purposes. The diagonal line indicated by reference character 7 represents the performance curve of a nominal head. This curve could move up or down depending on the head design. In the prior art, after assembly of the disk drive the performance of each head with its respective surface was measured to determine if it met the minimum performance standard TH. If any of the heads in the stack of disks failed to reach at least a minimum TH, then the drive was considered unacceptable and was not shipped unless it could be reworked to make it meet the minimum performance standard. Rework in this scenario involved replacing the bad head(s) and/or disk, rewriting the servo information and retesting the drive.

An illustrative, hypothetical example of this test is illustrated in FIG. 3 where the performance of heads HD #1, HD #2, HD #3, and HD #4 are plotted at the typical average operating frequency $f_R$. Head HD #1 has a log offtrack bit error rate (LOBER) equal to about 5.5 at $f_R$, while head HD #2 is approximately 6.5, HD #3 about 7.9 and HD #4 approximately 8.5. Following prior art test constraints, since head HD #1 is below the minimum acceptable threshold, the drive failed and would not be usable under traditional formatting conditions.

A second design criterion used by prior art designers was stroke for the heads, the radial travel expected for the read/write heads. One criterion used was worst case stroke, and another single sided detect stroke. Typically one or the other of these values was used in testing of the assembled drives and the drive evaluated based on the measured stroke of the drive after assembly. If the actual stroke was not up to the specification, then the desired number of tracks could not be accessed, the drive was rejected. Commonly, rework would be attempted, which involved replacing or adjusting the crash stops, then rewriting the servo information and retesting the drive.

Referring to FIG. 4A, a graphical illustration is provided of two prior art methods used for specifying the minimal acceptable stroke under the worst case stroke analysis, and secondly under the single sided detect analysis. The bell curve at the OCS and the ICS indicate the expected mechanical tolerance distribution of the location of the outer crash stop and inner crash stop, respectively, on a drive based on the three-sigma (3σ) tolerance values. In FIG. 4A, the vertical line in the center of the ICS and OCS mechanical distribution curves indicates the mean dimension. In the prior art, servo data is written on the disks before the crash stops are placed in the drive. If the position variance of both the inner and outer crash stop is $\sigma^2$, then the average position lost (i.e. usable position lost for recording data) on a drive where all tracks are written before the crash stop positions are detected is $6\sigma$, the worst case stroke (w.c. stroke) indicated in FIG. 4A. On prior art drives which detect one crash stop and then a write tracks until the second crash stop is detected, the average position lost is:

$$\text{Position lost} = \frac{3\sigma}{\sqrt{2}} \qquad \text{(eq. 1)}$$

Thus it will be appreciated that in both prior art methods since assumptions are made about the usable data area based on the above techniques, there is a loss of available position for storing information.

In prior art products, zone tables were established for a disk drive model at the design stage, with the zone boundaries, the frequency for each zone and the number of tracks to be used being specified. This resulted in zone alignments such as those illustrated in FIG. 1. Although not shown in FIG. 1, if the lower surfaces of disk 1 and 2 were used, as would be typical, the zone boundaries and read/write frequency within the boundaries, would be the same for the upper and lower surfaces of all of the disks. After gaining experience with the drive model based on production, the zone tables were sometimes changed for all drives in subsequent production runs, however for all drives in the subsequent production runs the zone boundaries and the read/write frequency for the zones both remained vertically aligned, again as illustrated in FIG. 1. If it was determined that additional tracks could be used, that may have also been factored in when establishing zone boundaries.

In addition to the foregoing criteria used in the prior art in disk drive design, the number of tracks per inch, also known as the track pitch, was established based on the expected track width of a signal written on a surface of a magnetic disk considering the nominal performance of heads, also referred to as read/write transducers, of the type being utilized in the drive. If the actual width of tracks written by a head was less than the expected/nominal width, then valuable recording space was lost since the tracks could have been spaced more closely without track-to-track interference.

SUMMARY OF THE INVENTION

In accordance with the present invention, a series of disk drives is provided, each drive in the series being assembled from a predetermined set of components for a head disk assembly and drive electronics. Using the adaptive zone recording technique in each drive provides a series of drives each of which exhibit common storage characteristics although performance characteristics of individual components in each drive may vary. Data is stored in a plurality of zones, each having a read/write frequency. On a drive-to-drive basis, the recording zone boundary layouts and the frequency grouping used may vary. Although the recording zone boundaries and frequencies may vary from drive-to-drive, the overall performance exhibited by each drive in the series is maintained. Zone boundaries and read/write frequency within the zones are established based on the read/write transducer—media surface combination performance, which may result in different zone boundaries and the use of a different group of read/write frequencies for corresponding recording surfaces of drives in the same series. Similarly, the zone boundaries on the surfaces of the same disk in a drive will not necessarily be vertically aligned. Additionally, the same group of read/write frequencies will not necessarily be used on the surfaces of the same disk in a drive of the series.

In addition to the parameter of recording performance of the read/write transducer at various recording frequencies, a track width of the recorded signal is measured and utilized in maximizing the storage capacity of disk drives of the series.

In the present invention, a method of defining a plurality of zones each having a read/write frequency for recording information on and the playback of information from a magnetic media using a read/write transducer is provided. The method comprises the steps of moving the media with respect to the read/write transducer and reading data from the media; measuring the performance of the read/write transducer; selecting a group of read/write frequencies one for each zone, based on the measured performance of the read/write transducer; and defining the boundaries of each zone based on the frequency selected for the zone.

As another feature of the present invention, a method of determining a width of a signal recorded on a magnetic medium by a read/write transducer is provided, the method including the steps of writing a test pattern at a location on a surface of the magnetic medium, reading the test pattern and determining the amplitude of the signal, moving the read/write transducer to a first position on one side of the written test pattern and writing a DC erase signal, moving the read/write transducer to the opposite side of the test pattern written and writing a DC erase signal, reading the test pattern at the originally written location and determining from the relationship between the first reading of the test pattern and the second reading a track width value of a read/write transducer.

In accordance with another aspect of the present invention, a method of defining a plurality of zones for recording data on and playback data from a disk having a magnetic surface using a read/write transducer is provided. A first radial boundary for a zone N is determined by positioning the read/write transducer to at least one reference radial position above the magnetic surface and measuring the performance of the read/write transducer at read/write frequencies during playback of data from the associated surface at the reference radial position; selecting a reference read/write frequency for the read/write transducer which provides a desired level of performance at said reference radial position; and selecting a target read/write frequency for the zone N. After the target read/write frequency has been selected, a ratio of the reference frequency and the target frequency is determined; a formula which characterizes the performance of the read/write transducer as a function of radial position is selected; and the first radial boundary for zone N is determined by equating the ratio of the target read/write frequency to the reference read/write frequency to the formula and solving for the first radial boundary.

In the present invention, a substantial improvement in the recording density is achieved by, in one aspect, testing the read/write frequency performance of each of the heads in a multi-head drive and for those heads having a lower than acceptable bit error rate at a predetermined operating frequency reducing the read/write frequency of those heads to bring them up to an acceptable bit error rate performance level; and for heads which have a bit error rate above the acceptable bit error rate at the predetermined operating frequency increasing their read/write frequency by an amount sufficient to make up for the loss of recording density on the head(s) for which the read/write frequency was reduced, but not so much as to fall below the minimum acceptable bit error rate.

In one embodiment, the average bit error rate is determined for all of the heads. Then the operating frequency of the lower performing heads is reduced until their bit error rate equals that of the average for all heads, and the operating frequency of the higher performing heads is raised until the bit error rate for those heads is equal to the average bit error rate.

In another embodiment of the present invention, the operating frequency of each head is adjusted to the highest frequency for which it will still provide at least the minimum acceptable LOBER, thereby providing maximum storage capacity.

In a further embodiment of the present invention, a variable zone layout technique is provided. In implementing the variable zone layout, the zone boundaries for each head-recording surface combination are defined as a function of an adjusted read/write frequency of the head.

In another embodiment of the present invention, the usable stroke is ascertained on a drive by drive basis by finding the inner crash stop and recording the track number, and then moving to the outer crash stop and recording that track number, thus determining the total number of tracks available. All tracks are used for data, rather than following the prior art technique of using a predetermined number. By optimizing the stroke, the longer the stroke the lower the average linear density and therefore the higher the yield or density/capacity for drives.

In accordance with the present invention, a substantial improvement in the recording density of a disk drive is achieved by measuring the track width of the signal written by a read/write recording head and utilizing the measured track width to establish a track pitch which achieves maximum usage of the recording surface.

In a disk drive utilizing a plurality of read/write transducers, in accordance with the present invention, the track width of each of the transducers is measured after assembly of the disk drive. The track pitch for the drive is established to accommodate the read/write transducer having the largest track width. In this embodiment, the disks are formatted utilizing the largest track width as the pitch parameter.

In accordance with another aspect of the present invention, read/write transducers are characterized by the width of tracks which they write. The read/write transducers are segregated into groups having a track width characteristic within an established range. Disk drives are assembled utilizing read/write transducers all from one group.

BRIEF DESCRIPTION OF THE DRAWINGS

Other objects and advantages of the invention will become apparent from a study of the specification and the drawings in which.

DETAILED DESCRIPTION OF THE PREFERRED EMBODIMENTS

Figure 1:
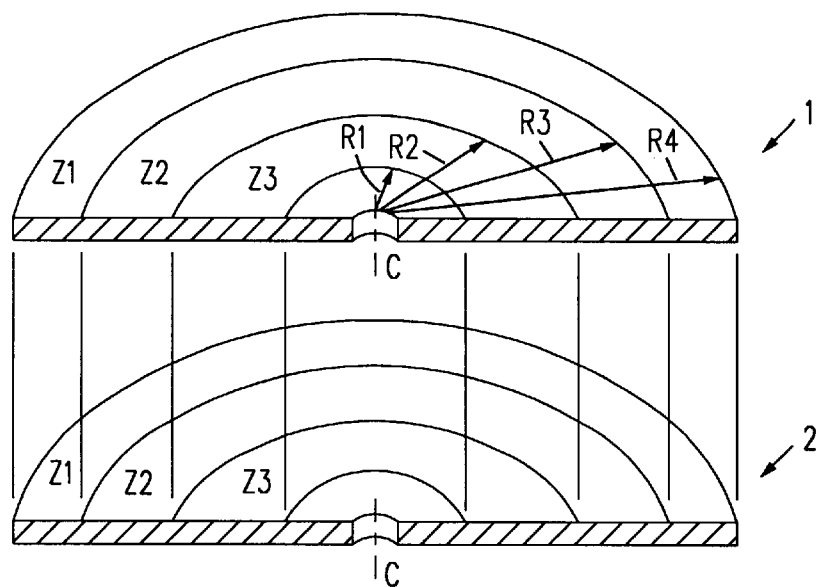
FIG. 1 illustrates a prior art zone layout for a pair of magnetic recording disks.
Figure 2:
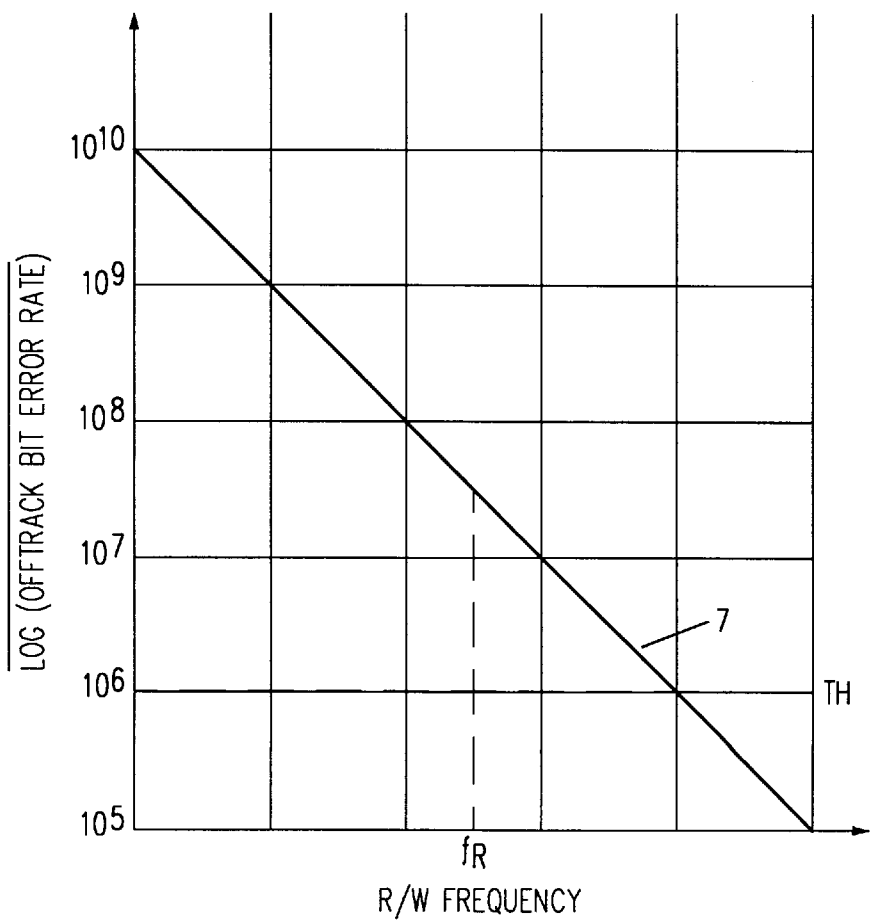
FIG. 2 is an illustration of a plot used for log offtrack bit error rate versus read/write frequency.
Figure 3:
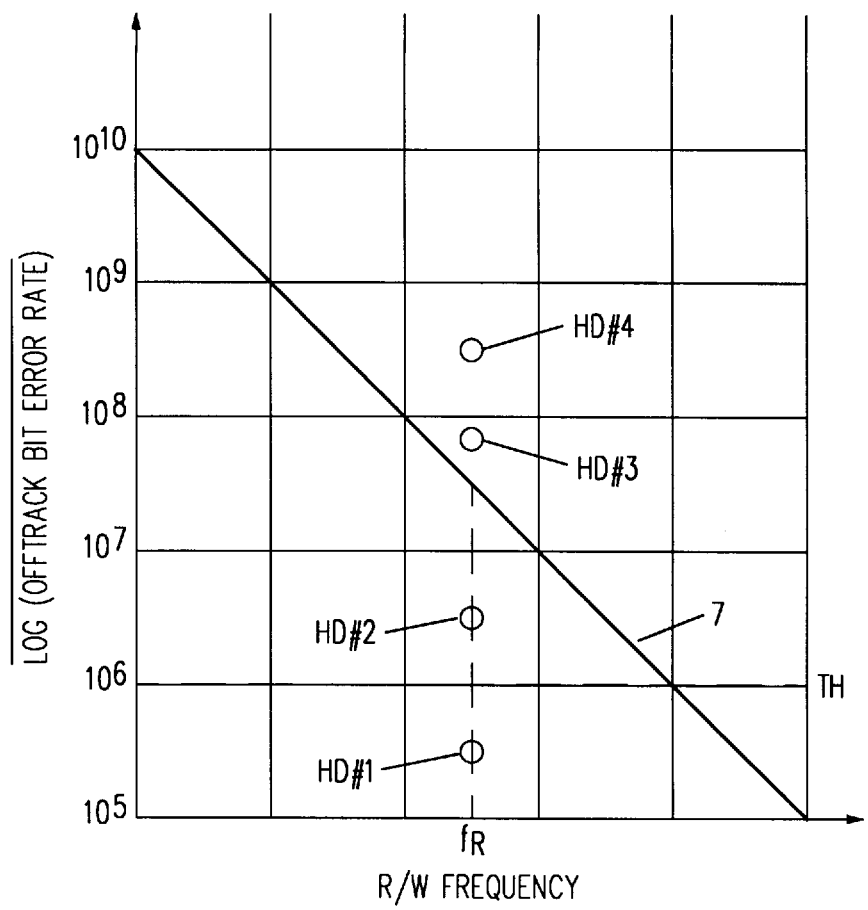
FIG. 3 is a hypothetical example of head performance for four magnetic heads.

As described above, in the prior art fixed zones were defined at the drive design stage, and predetermined frequencies established for those zones. For example, referring to FIG. 1, zones, Z1, Z2 and Z3 have radii established with respect to the center of the disk (indicated by c). If the performance of a single head fell below the minimum bit error rate (FIG. 3), then the drive would not have sufficient performance margin, nor meet the criteria of bit error rates to be acceptable. In accordance with one embodiment of the present invention, zone boundaries are established based on the measured performance of the heads, and the zone boundaries adjusted as appropriate to achieve from the plurality of head/disk combinations and pluralities of recording densities a disk drive with the level of performance desired for the drive, while maintaining the required capacity.

If the recording density capability of head/disk combinations is a normal random variable with a mean $\mu$ and variance $\sigma^2$, then the average density capability of N head/disk combinations has a normal distribution with mean $\mu$ and variance $\sigma^2/N$. In a standard, prior art drive design, such as one using the zone layout of FIG. 1, the density (d) must be set so:

$$d \leq \mu - 3\sqrt{\sigma^2} \quad \text{(eq. 2)}$$

to ensure 3 sigma yields, where $\mu$ is the center of distribution of all heads received. Utilizing adaptive zones in accordance with the present invention, which is described below, where the recording density can be increased on the better heads and reduced on poorer heads, the overall density d can be set to:

$$d \leq \mu - 3\sqrt{\frac{\sigma^2}{N}} \quad \text{(eq. 3)}$$

Then the improvement in density is:

$$\Delta d = 3\sigma\left(1 - \frac{1}{\sqrt{N}}\right) \quad \text{(eq. 4)}$$

If a $\sigma=0.05(\mu)$ then the density improvement is 7.5%.

Figure 12A:
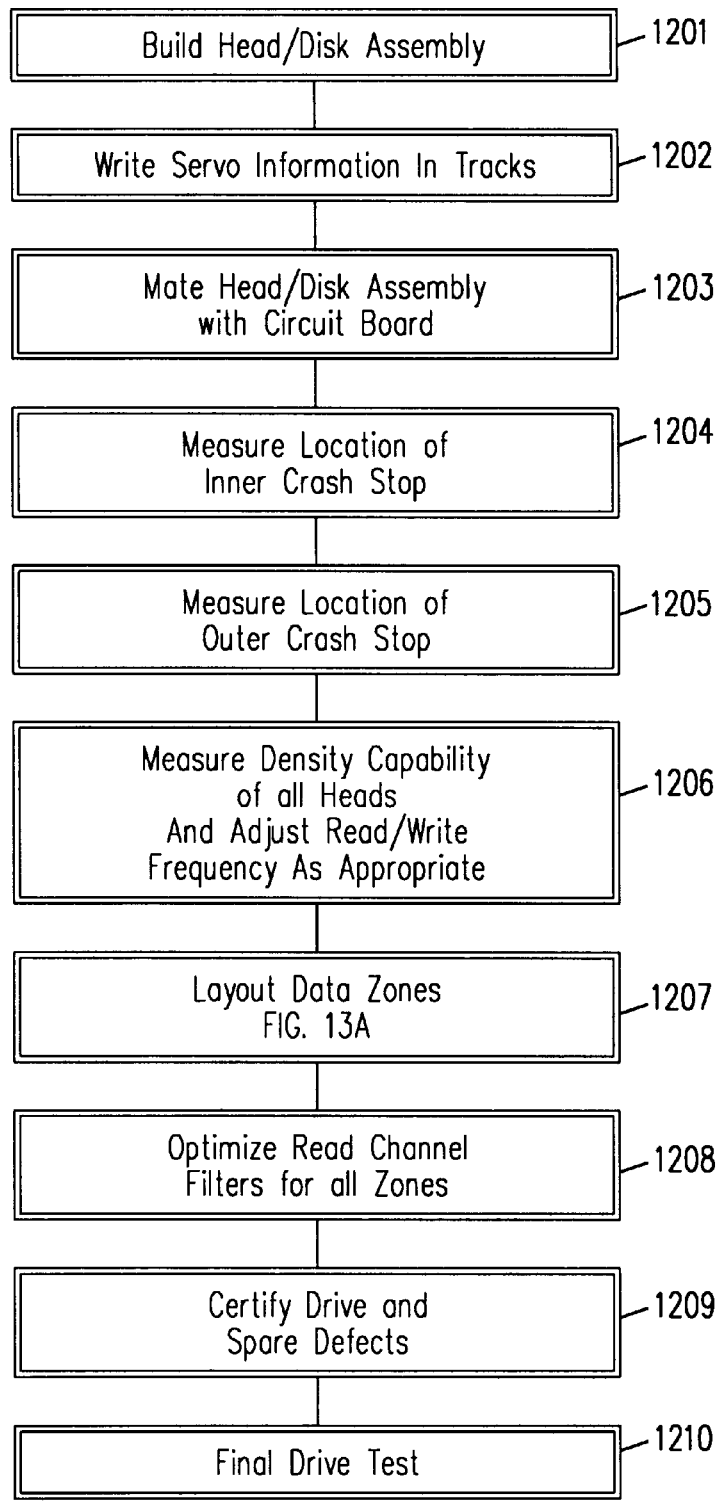
FIG. 12A is a flow chart illustrating the steps performed in one embodiment of the variable zone layout for a disk drive in accordance with the present invention.

FIG. 12A is a flow chart illustrating the steps of assembling a disk drive utilizing the adaptive zone layout in accordance with one embodiment of the present invention. In constructing a disk drive using the first embodiment of the adaptive zone invention, first the head/disk assembly is constructed, this step being illustrated in block 1201. Next, servo information is written in tracks on the disks (as indicated in block 1202) using a servo track writer of the type well known to those skilled in the art. The servo information may be written to a dedicated servo surface or embedded servo may be utilized. For embedded servo, an embedded servo system of the type illustrated in U.S. Pat. No. 5,321,560, issued Jun. 14, 1994 to Stephen R. Cowen, entitled "Embedded Servo System For Low Power Disk Drives", which is incorporated herein by reference in its entirety, may be used.

Next, as illustrated in block 1203, the head disk assembly is mated with the associated circuit boards and readied for test. In the next step, the heads are moved to the inner crash stop and the track number ascertained (block 1204). After the inner crash stop has been located, the heads are moved to the outer crash stop and the track number at that location is recorded (block 1205). As will be described more fully below, the use of all available tracks in the present invention improves the stroke and the available storage capacity of the drive.

Next, the recording performance of each of the heads in the drive is measured to determine the density capability of each of the heads (block 1206). Based on the measured head-disk performance, it may by desirable to adjust the read/write frequency of each head to achieve an overall performance objective for the drive. For example, adjustment may be made as illustrated below in connection with FIG. 5A, FIG. 5B, or to achieve other objectives.

Figure 13A:
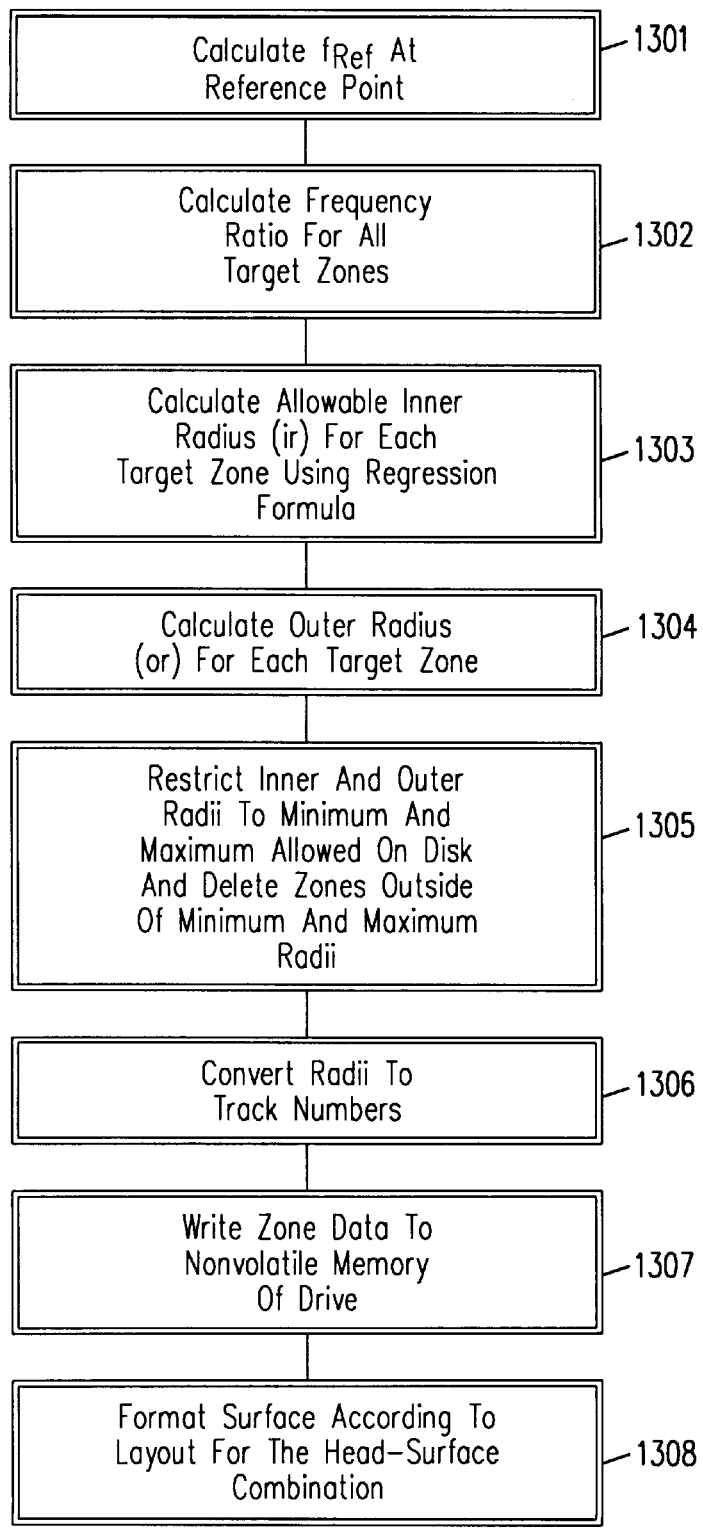
FIG. 13A is a flow chart illustrating zone boundary calculations and layout utilized in implementing variable zone layout in accordance with one embodiment of the present invention.

Using the information obtained in the preceding steps, a zone layout (block 1207) is generated for each head-disk combination based on the measured head performance. FIG. 13A includes a flow chart of the steps employed in generating the zone boundaries for each head based on the performance of the head and for providing data zone layout for each head-surface combination. The flow chart of FIG. 13A and formulas used in determining the zone boundaries are described in detail below.

Figure 12B:
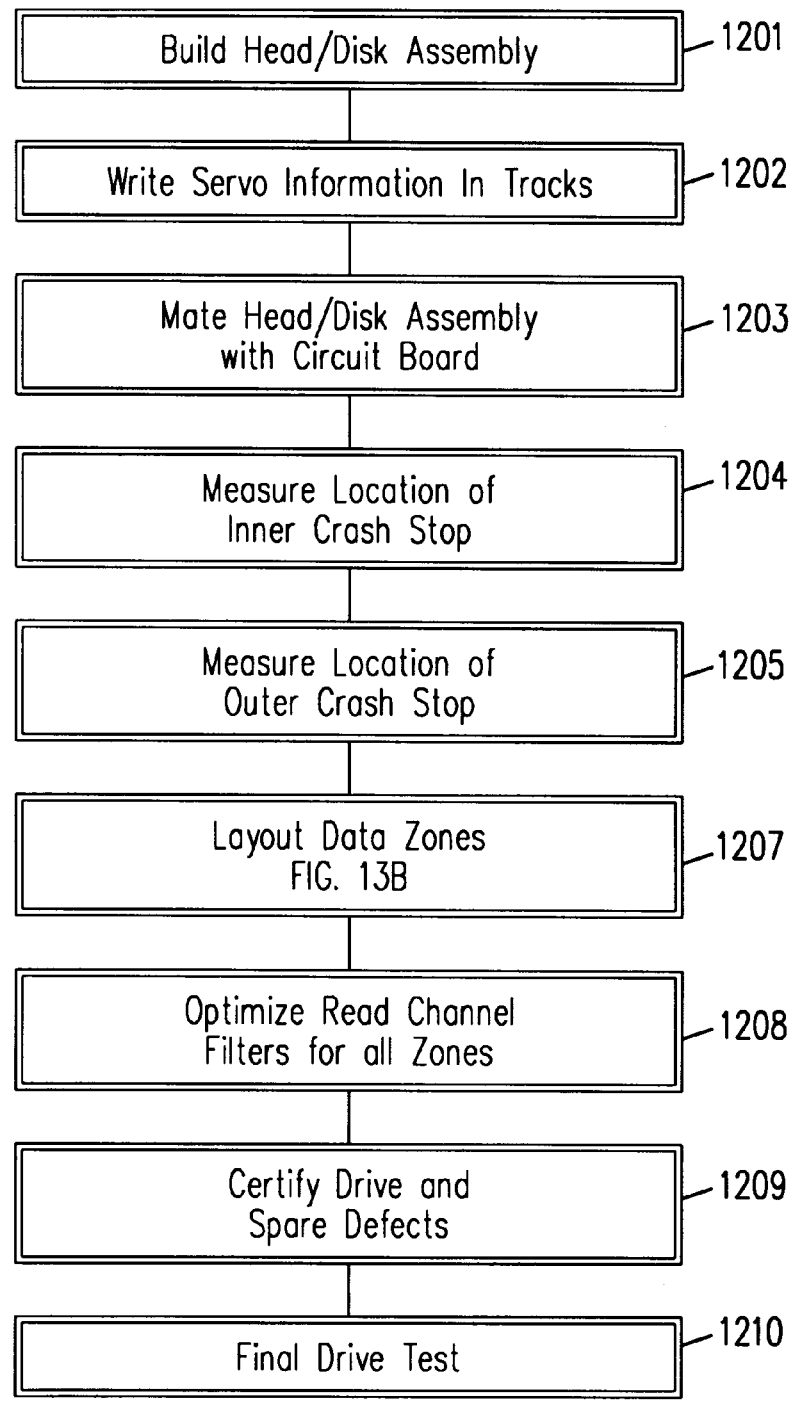
FIG. 12B is a flow chart illustrating the steps performed in another embodiment of the variable zone layout for a disk drive in accordance with the present invention.
Figure 13B:
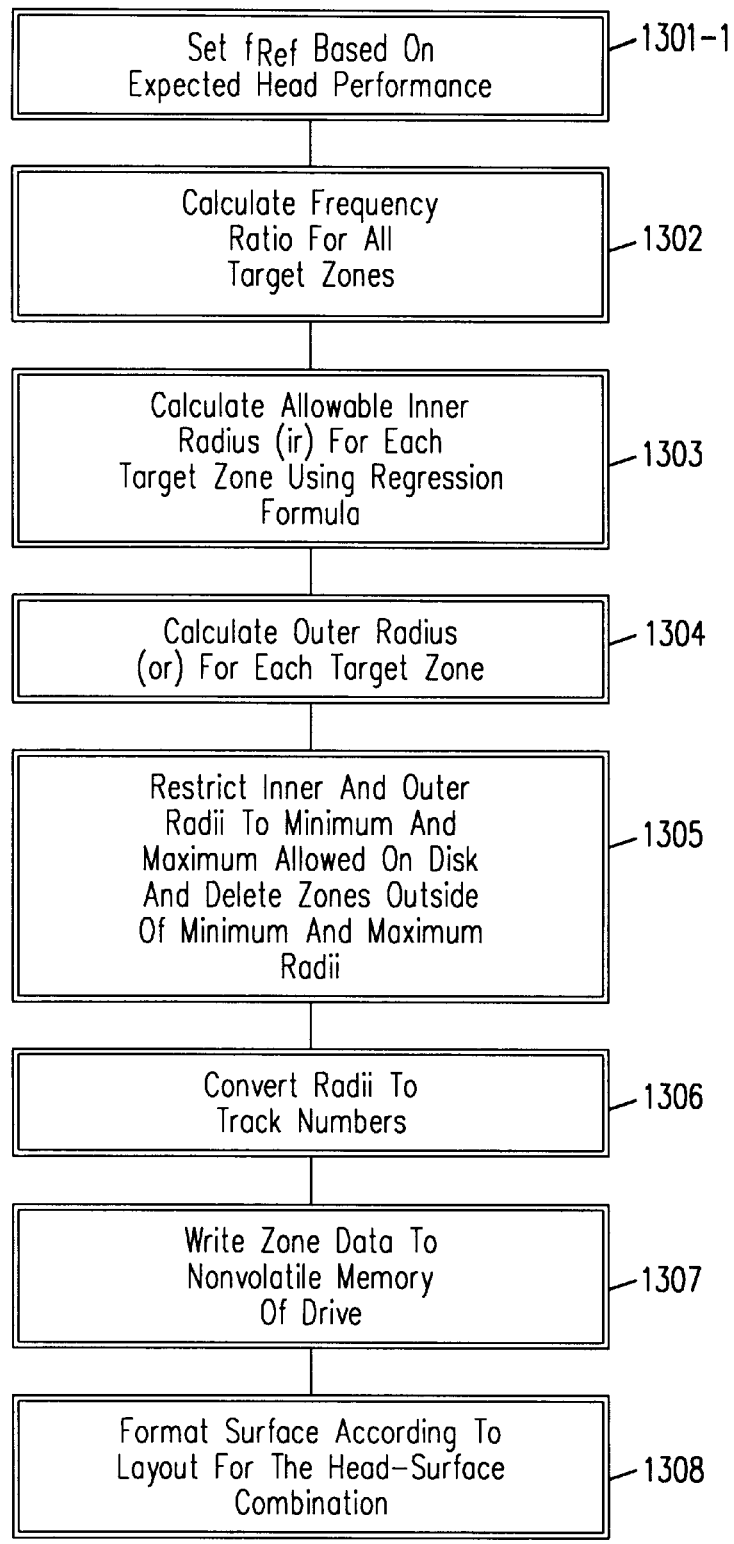
FIG. 13B is a flow chart illustrating zone boundary calculations and layout utilized in implementing variable zone layout in accordance with another embodiment of the present invention.

FIG. 12B illustrates an alternative method of constructing a disk drive in accordance with the present invention using the adaptive zone technique. The FIG. 12B technique utilizes many of the same steps employed in FIG. 12A, however in the FIG. 12B process, the zone layout is made based on the measurement of available stroke (measuring the inner crash stop location, then the outer crash stop location to determine the maximum available usable tracks). In the process of FIG. 12B, it is assumed that the performance capability of all of the heads meet an average criterion. The flow chart in FIG. 13B is used in the zone layout when the process in FIG. 12B is followed. It will be noted that in the first step in FIG. 13B (block 1301-1) a reference frequency $f_{ref}$ is selected based on expected head performance rather than an adjusted read/write frequency used in the process flow of FIG. 12A. The remaining steps in FIG. 13B are the same as those in FIG. 13A. This technique has the advantage over the prior art in which an available stroke was assumed, and zone boundaries were established without ascertaining the actual, available stroke on a drive-by-drive basis.

Figure 12C:
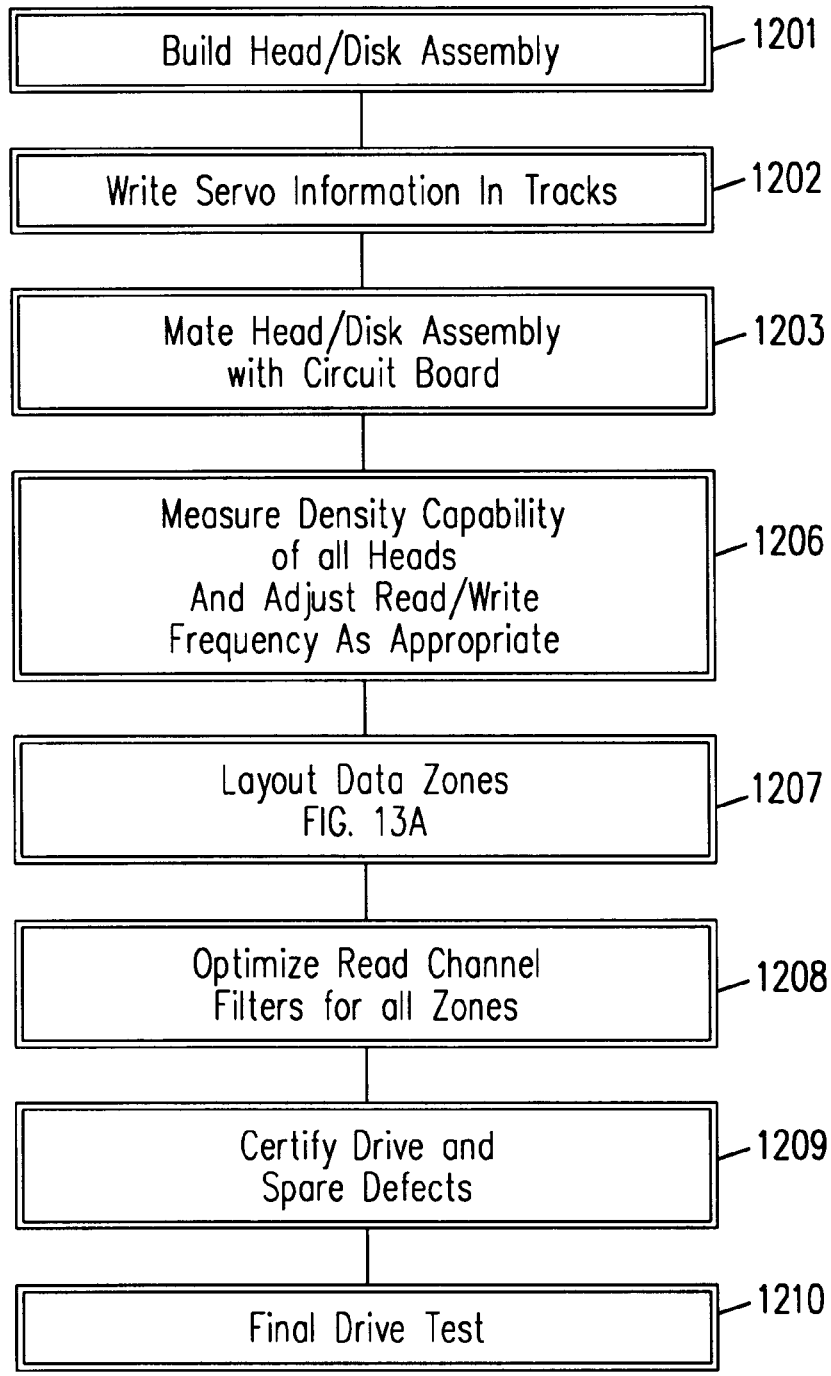
FIG. 12C is another flow chart illustrating the steps performed in yet another embodiment of the variable zone layout for a disk drive in accordance with the present invention.

FIG. 12C illustrates yet another embodiment of the present invention utilizing the adaptive zone technique to construct a disk drive. In the method illustrated in FIG. 12C the measurement of head performance capability and adjustment of read/write frequency as appropriate to achieve the desired result (block 1206) is employed as in the FIG. 12A flow chart, however in the FIG. 12C process, the location of the inner and outer crash stops are not measured. It is assumed using the FIG. 12C procedure that a given stroke is available. In the layout of zones procedure (FIG. 13A) when used with the FIG. 12C process, the inner and outer radii are assumed based on the predicted available stroke rather than measurement as used in FIG. 12A.

Figure 12D:
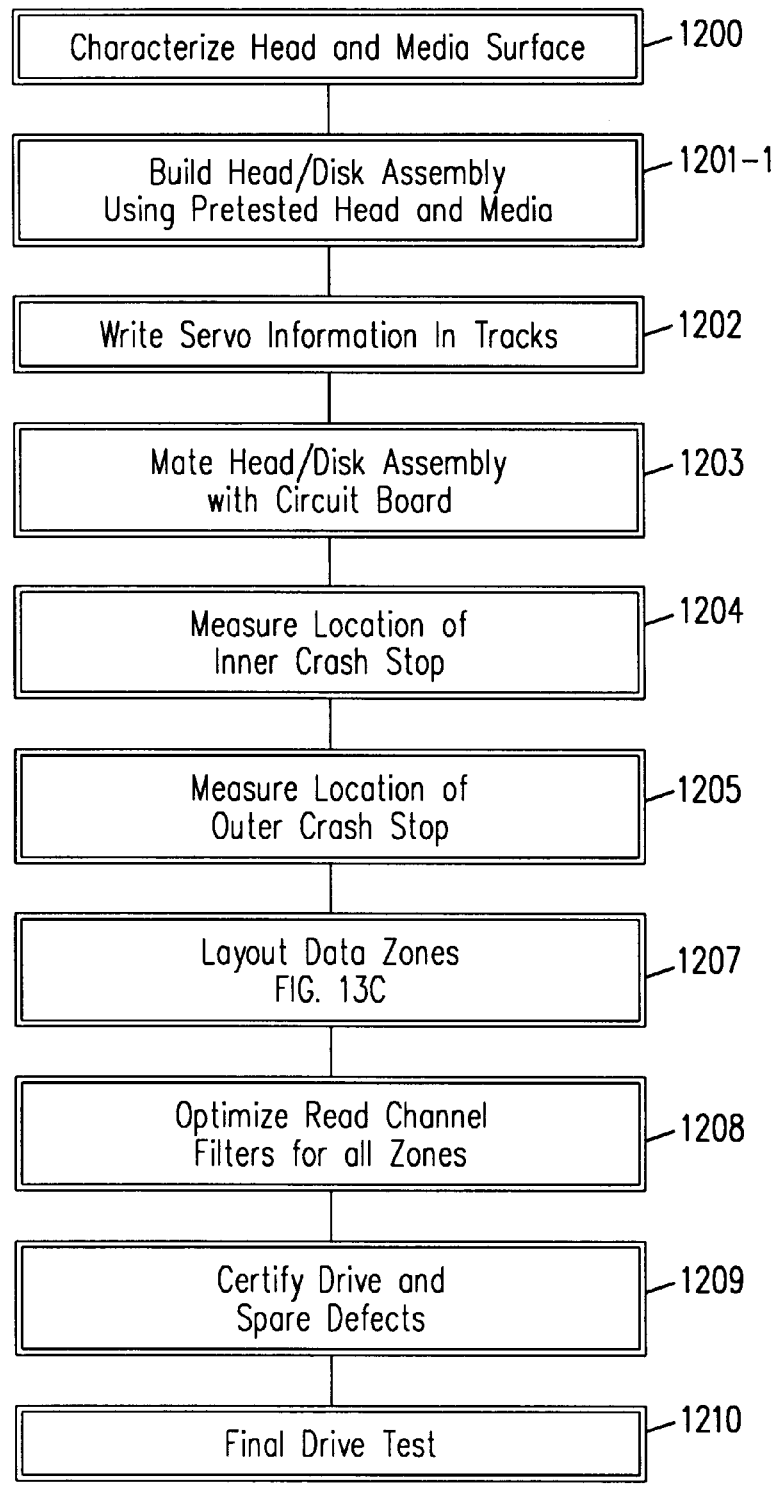
FIG. 12D is a flow chart illustrating the steps in an additional embodiment of variable zone layout of a disk drive in accordance with the present invention.

In the embodiments of the invention illustrated in FIGS. 12A and 12C the density capabilities of the heads used in the drive are tested and adjusted as appropriate based on the operation of the head mated with the media surface (block 1206). Alternatively, a disk drive in accordance with the present invention may be constructed and the zone boundaries and zone recording frequencies determined based on the flow chart illustrated in FIG. 12D. When using the FIG. 12D assembly procedure, the zone boundaries and frequencies for the zones are determined based on the flow chart of FIG. 13C. Turning to FIG. 12D, in the first step in the process the heads and media surfaces are tested (block 1200). In testing and characterizing the heads, a standard disk media having a surface of the type to be used in the disk drive to be assembled is mated with the head under test. Head characteristics are determined in the manner described herein based on the test of an assembled head-media combination of the FIG. 12A and FIG. 12C flow charts. The characteristic of the head is then noted and recorded, and kept with the head for use when the head is assembled with an associated disk. Similarly, the disks to be utilized are characterized based on use of a standard head and each surface is given a quality rating based on its performance with respect to a standard head. The surface quality is recorded and kept with the disk so that information may be used when the media surface is mated with a head.

Following the characterization of the head and media surfaces, the head disk assembly is assembled using the pretested head and the media (block 1200-1). The remaining steps in blocks 1202, 1203, 1204 and 1205 are performed as described above.

Figure 13C:
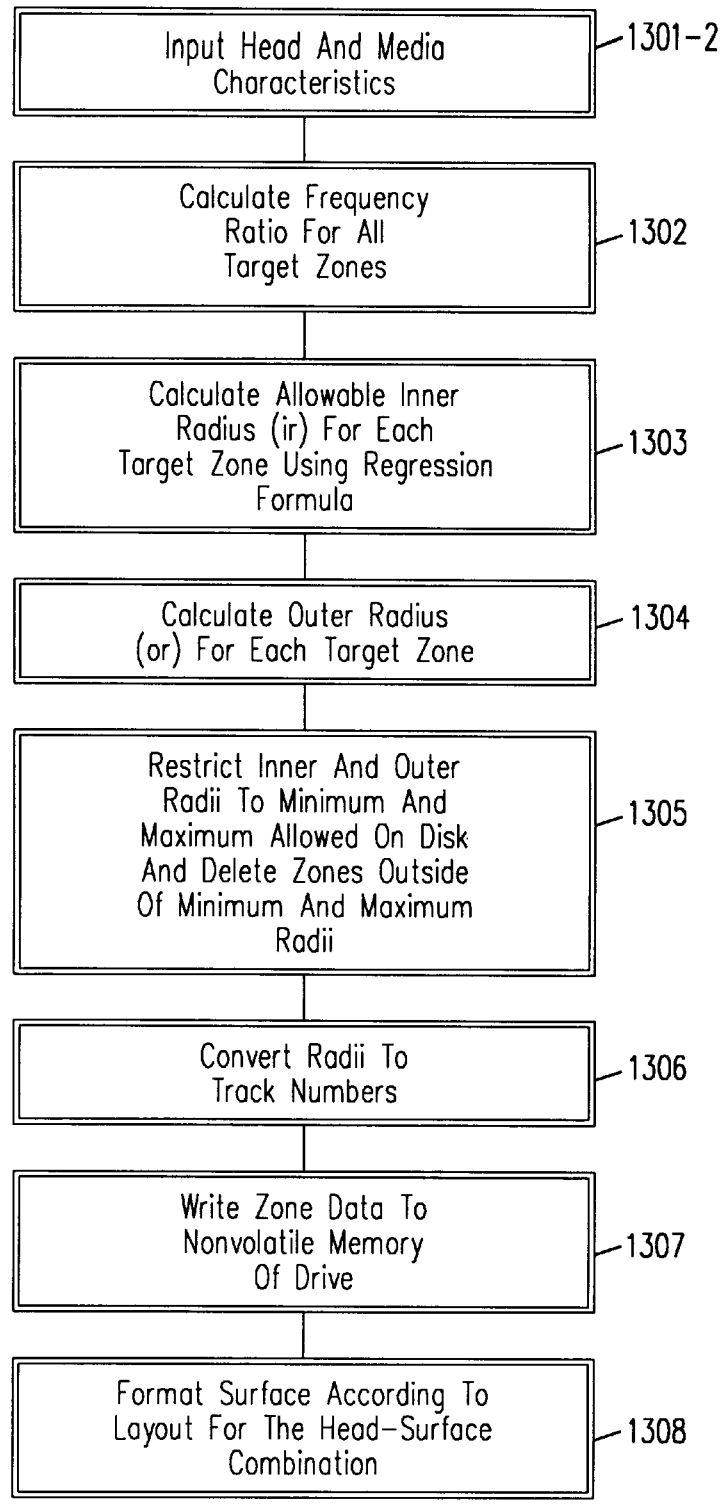
FIG. 13C is a flow chart illustrating the steps used in zone boundary calculations and layout in accordance with a further embodiment of the present invention.

The calculation and determination of the zone boundaries and frequencies to be utilized with the disk drive produced in accordance with the flow chart of FIG. 12D is illustrated in FIG. 13C. Turning to FIG. 13C, in the first step (block 1301-2), the head and media characteristics determined in block 1200 (FIG. 12D) are utilized to determine the reference frequency $f_{Ref}$. Using $f_{Ref}$ in Equation 6 below, the frequency ratio is calculated in block 1302. After the frequency ratio for all target zones has been calculated in block 1302, then the remaining blocks in FIG. 13C follow those described above with regard to FIGS. 13A and 13B.

After the zone boundary layout has been accomplished, the filters in the read channel are optimized for all zones (block 1208), by techniques well known to those skilled in the art. After read channel filter optimization, the drive is tested to determine if any defective sectors exist and if so the drive is reformatted to spare the defects (prevent usage of areas having defects), these steps being illustrated in block 1209. After certifying the drive and reformatting to prevent use on any defective sectors, a final drive test is performed (block 1210) and the drive is ready to ship.

Track Width Measurement Prior to HDA Assembly

As pointed out above in the description of the prior art, heretofore disk drive designers have assumed a nominal width of tracks written by read/write transducers based on manufacturers' specifications. In the formatting of disks, the number of the tracks per surface were therefore written based upon expected, as contrasted to the actual, width of the tracks written by read/write transducers. A further improvement in the storage capacity of disk drives may be achieved by measuring the actual width of the tracks written by the read/write transducer and formatting disk surfaces using this information. It will be appreciated that with the additional tracks which may be available based on better than expected performance of a read/write transducer in conjunction with the use of the variable zone layout based on the read/write transducers, further improvements in storage capacity will be achieved.

Figure 15:
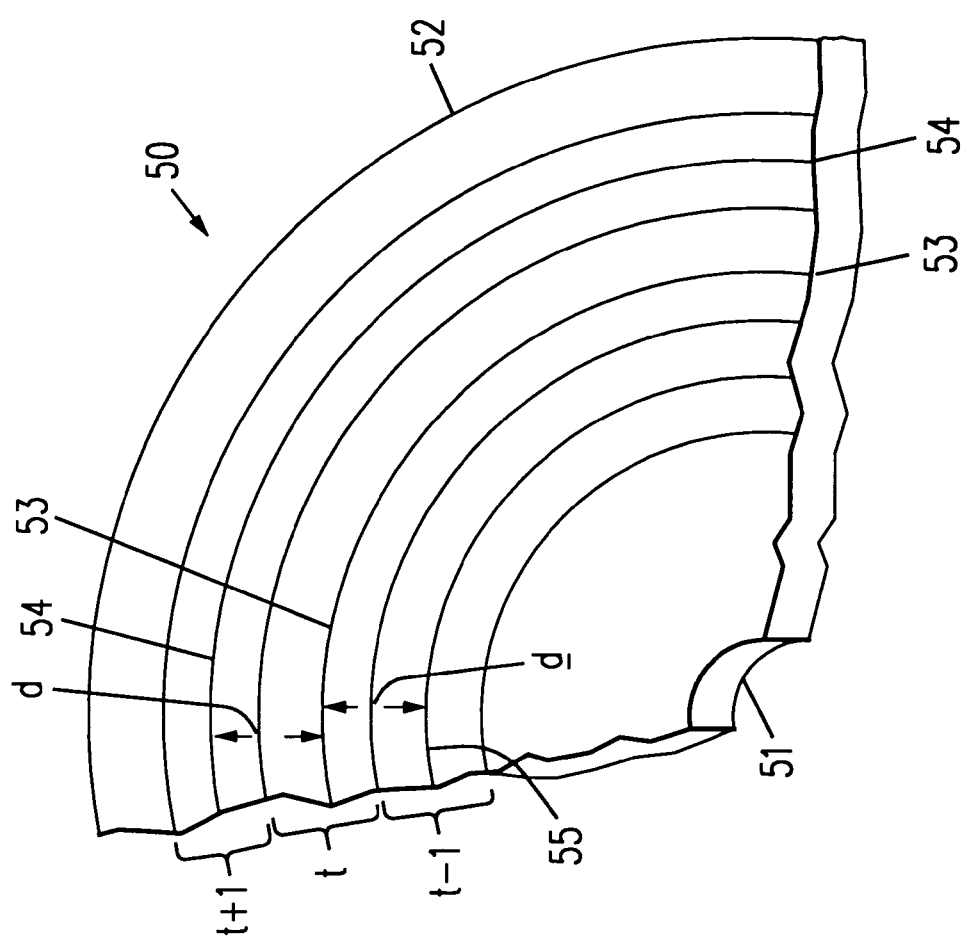
FIG. 15 shows a partial cut-away view of a disk with track locations indicated for track width testing described herein.

Reference is made to FIG. 15 in conjunction with the following explanation of measurement of a track width for a read/write transducer in accordance with the present invention. Referring to FIG. 15, magnetic recording disk 50 is shown in a perspective, partial diameter view, with inside diameter (ID) indicated at 51 and outside diameter (OD) indicated at 52. In determining a track width of a single track written by a read/write transducer, a data pattern is written at track t, the center line of which is indicated by reference character 53. Although track t may be arbitrarily located at various positions on the disk surface, a position near the outer edge of the data area is preferable. The written test pattern should preferably be a constant frequency NRZ signal having a constant amplitude. The frequency of the test pattern is preferably at or near the highest recording frequency which is expected to be used in the disk drive. One technique which may be used in testing for track width is to utilize any standard, well-known head gimbal assembly (HGA) tester to position the read/write transducer mounted as part of an HGA above the surface of magnetic disk 50.

Next, the recorded test pattern is read and the amplitude of the signal measured is stored for future use. After measuring and storing the amplitude of a signal read at track t, the read/write transducer is moved to track t+1, the centerline of which is indicated by 54 which is a distance d from the centerline of track location t. The distance d is, at the outset, established based on the expected minimum track width of a read/write transducer of the type under test. If the read/write transducer has an actual written track width greater than the minimum expected for the device, then in subsequent tests distance d may need to be increased. With the read/write transducer at track t+1, a DC erase signal is written. Next, the read/write transducer is moved to track t−1, the centerline of which is indicated by reference character 55. As in the prior step, the distance d is the minimum expected track width for the read/write transducer under test. At track t−1, a DC erase signal is written. It will of course be appreciated that by writing a DC erase signal at an expected track width distance on opposite sides of track t any portion of the test pattern which extends wider than the expected track width will be erased by the DC erase signals written adjacent to the track.

The read/write transducer is then returned to the original position over track t, the test pattern is read, and the amplitude of the test pattern signal stored for comparison with the amplitude of the test pattern signal measured prior to writing the DC erase signals on opposite sides of track t.

A comparison is now made between the amplitudes of the signal read from track t based on before and after writing of the DC erase signals. Based on the ratio of the signal amplitude after the writing of the DC erase signals to the signal amplitude before, a proportionate ratio is formed to determine the percentage of the signal remaining.

The percentage of signal remaining is noted and the HGA is either marked with the percentage figure or placed in a container marked to indicate a range of percentage values. The same tests are performed on other HGAs to characterize them by a percentage of signal remaining and based on the test results they are segregated into like performing groups. To maximize the areal storage density, disk drives are assembled using HGAs with read/write transducers having a similar track width characteristics. An example of one grouping of HGAs is: read/write transducers with 80% or better amplitude retention would be used in assembling HDAs using a track pitch of 5500 tracks per inch; heads with a remaining percentage of signal amplitude between 60% and 80% would be used to assemble HDAs with a track pitch of 5000 tracks per inch; heads with remaining percentage of amplitude of between 40% and 60% would be used in HDAs with a track pitch of 4500 tracks per inch; and heads with 20% or less retained signal would not be used.

Alternatively, optical techniques may be utilized to characterize an expected recorded track width performance rather than testing with a HGA tester in the process described above. In using the optical method, the gap width may be observed at the slider level and the sliders grouped for use in a HDA based on the observed gap width. As an example of grouping based on observed gap width, sliders having a gap width below 4.3 $\mu$m would be set aside for use in disk drives having a track pitch of 5500 tracks per inch; sliders having a gap width between 4.3 $\mu$m and 4.7 $\mu$m would be used for disk drives having a track pitch of 5000 tracks per inch; and sliders with a gap width greater than 4.7 $\mu$m would be separated for use with disk drives employing a track pitch of 4500 tracks per inch.

In both of the above-described techniques, the track width characteristic of the read/write transducer is determined in advance of assembly of a disk drive. This permits the grouping of read/write transducers having similar characteristics which maximizes the storage capacity which may be achieved in a disk drive. This follows since there is no lost storage capacity based on the use of one or more lesser performing heads with superior heads from a minimum track width standpoint, which is the case when an HDA is constructed using read/write transducers with mixed track width characteristics. This latter situation requires using a track pitch based on the read/write transducer having the lowest track density capability.

Track Width Measurement After HDA Assembly

Rather than characterizing the track width of read/write transducers prior to assembly of the HDA, their track width capability may be tested after the construction of the HDA and prior to writing the servo information in tracks on each of the surfaces in the case of embedded servo, or servo information on a dedicated servo surface use for all of the heads in a group served by a common actuator.

In the method in which the track width characteristic of each of the heads is determined after a plurality of heads with associated track surfaces are assembled into an HDA, each read/write transducer is characterized utilizing the process described above, except a servo track writer is used to move each read/write transducer during the process of writing the test track and, erase signals on opposite sides of the test track, followed by the comparison of the signal remaining to the original signal to characterize the width of the track written by the read/write transducer. After each read/write transducer is characterized, the track pitch is established for the group based on the use of a pitch to accommodate the read/write transducer having the lowest track density capability (largest track width). After the track pitch for the group of read/write transducers in the stack is determined, then servo information is written in tracks on the stack of disks by the servo track writer. Alternatively, in the case of a dedicated servo surface, the servo information is of course written only on tracks on the dedicated servo surface. The above characteristics of the track width characteristic can be performed using standard, well-known servo track writers.

Utilizing the parameter of the measured track width of the heads (read/write transducers) in addition to the measurement of recording density capability of the heads, and adjustment of read/write recording frequency provides improved performance capability not previously achieved in the prior art. FIGS. 16, 17, 18 and 19 illustrate flow charts of steps used in assembling a disk drive utilizing adaptive zone layout along with track pitch established based on the measured track width of the read/write transducers prior to HDA assembly. In FIGS. 16–19, the track width of the heads is determined as the first step in the sequence and similarly performing read/write transducers are used in the HDA. Techniques such as those described above, or other techniques, may be utilized in the determination of the track width of the heads.

Figure 16:
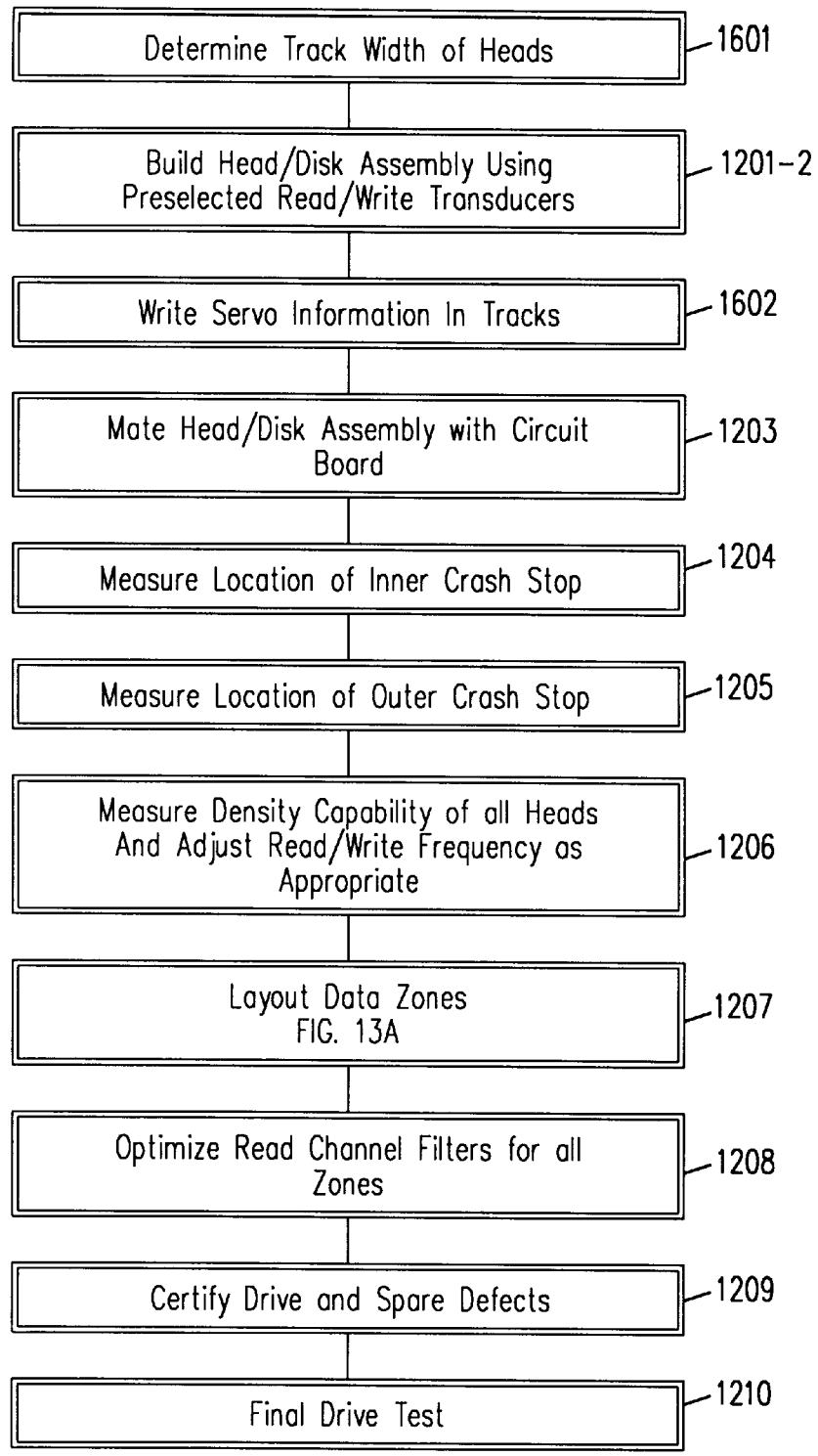
FIGS. 16–23 are flow charts illustrating the steps in further embodiments of the present invention using variable zone layout, taking into consideration track width as well as the recording density capability of read/write transducers as a function of read/write frequency.

Turning to FIG. 16, the first step in the assembly process is 1601 in which determination of the track width of the head or heads to be used is determined. In step 1201-2, a head disk assembly is assembled using preselected read/write transducers tested for track width. As pointed out above, to provide maximum advantage for disk drives which are assembled using the technique of sorting by written track width (or observed pole spacing), the head disk assembly is constructed using heads of similar track width characteristics (the preselected group).

After the disk assembly is assembled, the HDA is placed on a servo track writer and servo information is written at a track pitch consistent with the track width performance of the group of heads utilized in the HDA. As will be noted by comparing FIG. 16 with FIG. 12A, the steps following 1602 in FIG. 16 are the same as those utilized after step 1202 of FIG. 12A.

Figure 17:
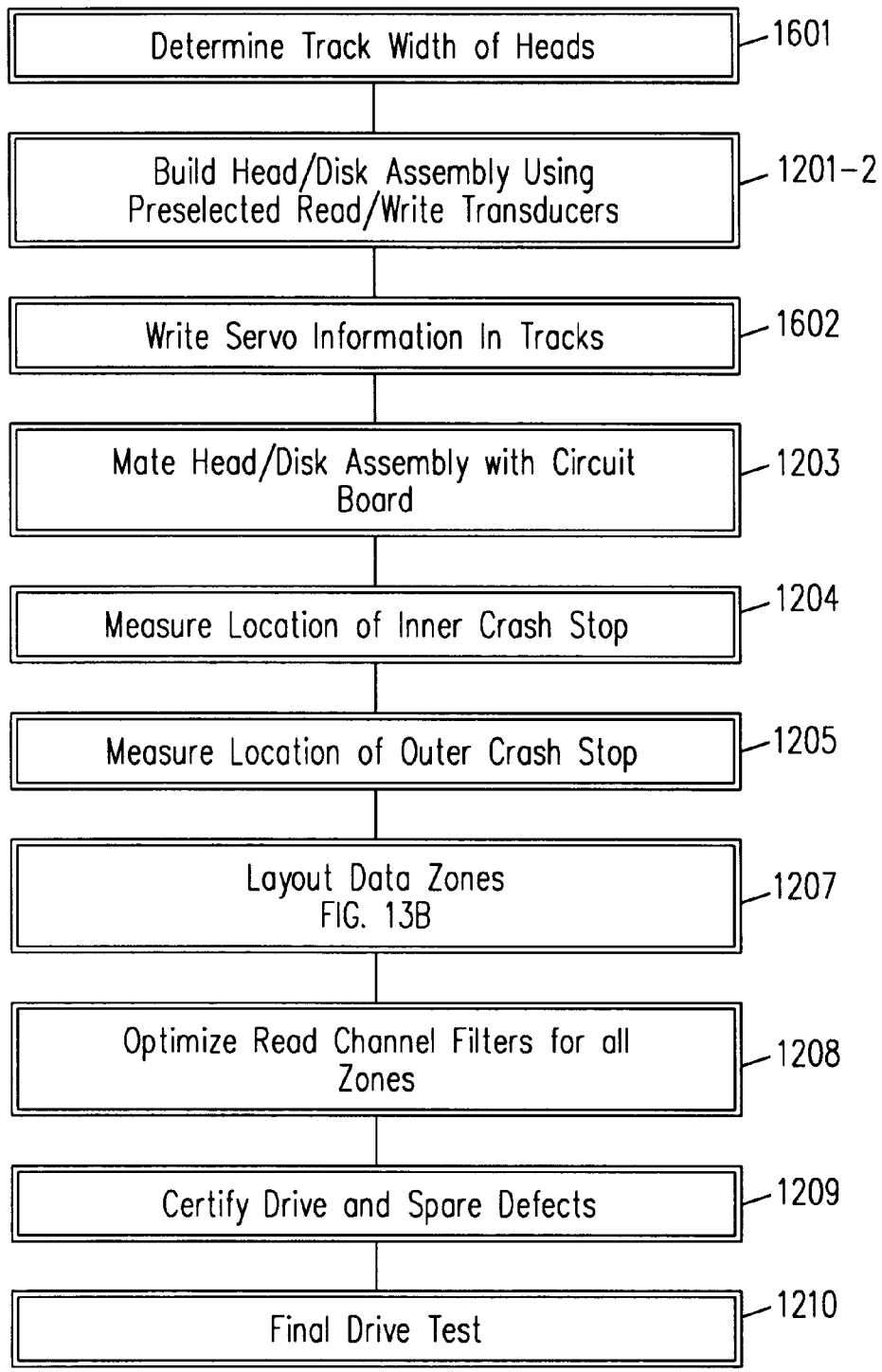

An alternate process for building disk drives is illustrated in FIG. 17 which demonstrates utilizing both the track width of the heads and the measurement of available stroke (by measuring the inner crash stop and the outer crash stop) and utilizing the track width of the heads determined in step 1601. As indicated by like numbered steps, steps 1601 and 1602 of FIG. 17 are the same as 1601 and 1602 of FIG. 16. In the process of FIG. 17 it is assumed that the read/write performance in terms of frequency performance of all the heads meet an average criterion. The flow chart illustrated in FIG. 13B is used in the data zone layout.

Figure 18:
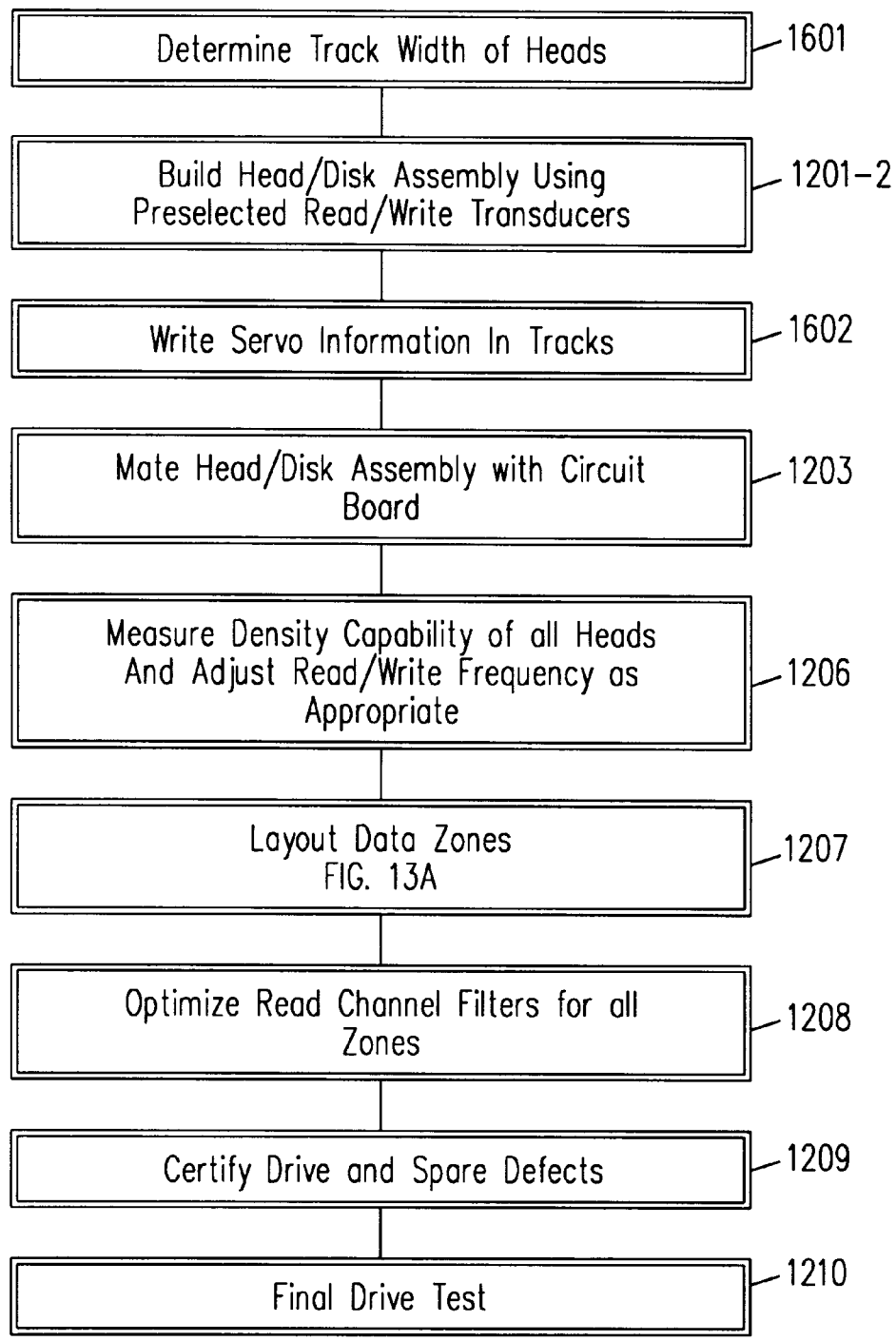

FIG. 18 illustrates yet another embodiment of the present invention in which both the track width of the heads and the measurement of head recording capability and adjustment of read/write frequency are utilized. A number of similarities exists between the assembly process illustrated in FIG. 18 and those of FIG. 16, however, one notable exception is that in the process flow of FIG. 18, the measurement of the inner crash stop and outer crash stop is not performed, it being assumed that an average stroke is available.

Figure 19:
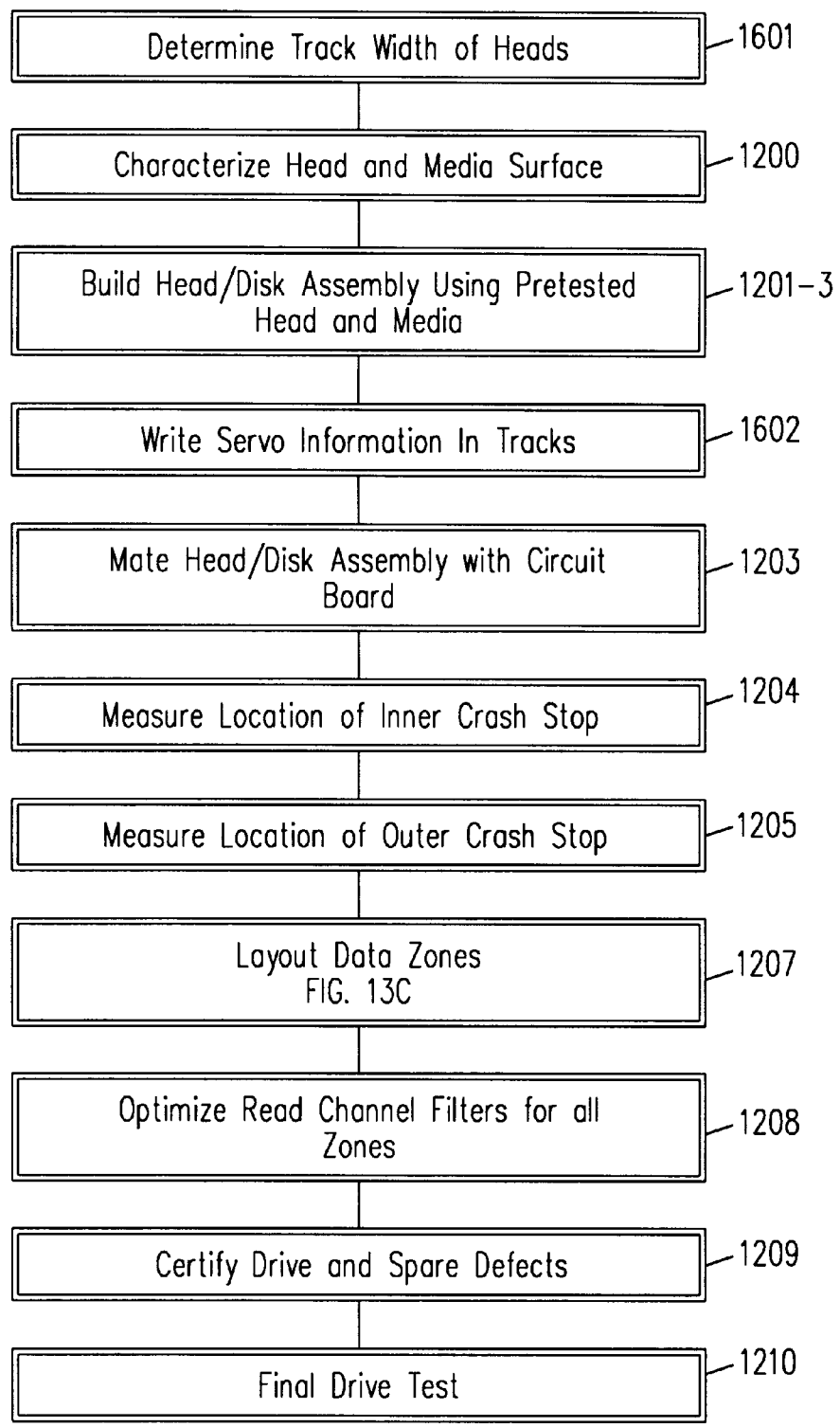

In FIG. 19, a disk drive is assembled using a process in which the track width of the heads is determined (step 1601), and the read/write performance of the heads is characterized using a standard disk media having the characteristics of the type which will be used in the assembly of the disk drive. Also as part of step 1200 the disks utilized in the assembly of the disk drive are characterized based on the use of a standard head and each surface is given a quality rating based on its performance with respect to the standard head. The disk surface quality is recorded and kept with the disk so that this quality rating may be used when the media surface is mated with a head. When compared to FIG. 12D (which has an assembly process similar to that illustrated in FIG. 19), it will be noted that a number of common steps is employed. An advantage of the FIG. 19 process over the FIG. 12D process is that since the track width of heads to be used is ascertained, the maximum number of tracks usable for the surfaces may be written (step 1602) on the disks, thereby improving the storage capacity. It will be noted that in the flow chart at FIG. 19 in step 1201-3 the HDA is assembled using read/write transducers which have been grouped based on both their read/write performance from the recording frequency aspect as well as their track width characteristic.

In the processes illustrated in FIGS. 16–19, the track width of the read/write transducers (heads) is determined either individually at the slider level or at the HGA level, and the like performing heads used in the assembly of disk drives. As pointed out above, this advantageously permits the maximum track density.

Figure 20:
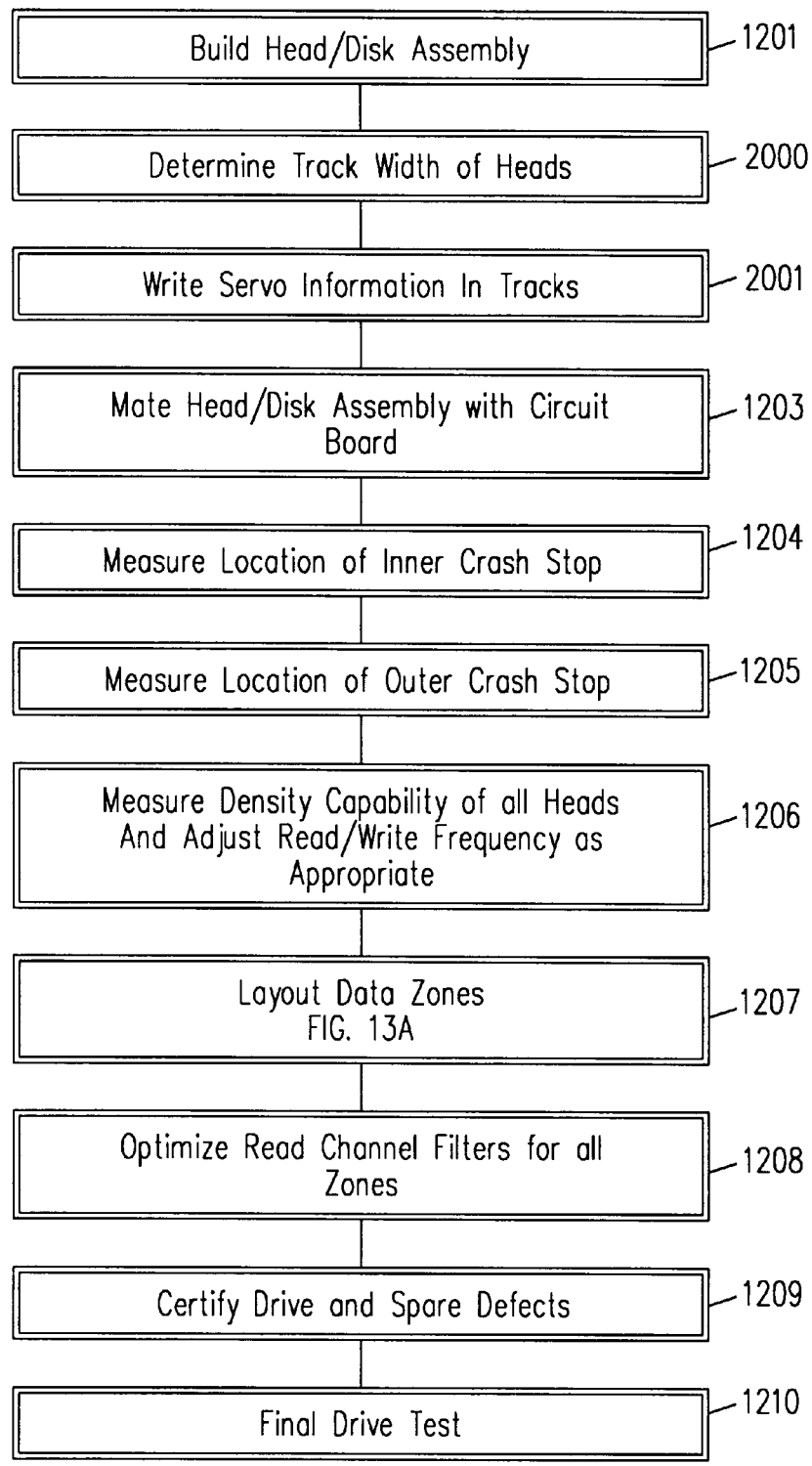

Rather than test the track width prior to assembly, a stack of heads and disks may be assembled and then the track width of each of the heads in the stack determined using the processes described above. An example of an assembly flow chart for one embodiment of the present invention following this technique is illustrated in FIG. 20. Referring to FIG. 20, in step 1201 the head disk assembly is assembled using components which have not necessarily been tested for performance beyond the vendor level of testing. In step 2000, the track width of each of the heads is determined using the technique described above with the head disk assembly being tested using the servo writer before the servo information is written in tracks. For disk drives using a plurality of heads, the track pitch is established using the pitch necessary to accommodate the lowest performing read/write transducers (widest written track width) as the pitch for the stack (step 2001). With the exception of steps 2000 and 2001, the assembly process of FIG. 20 is the same as that used with FIG. 12A.

Figure 21:
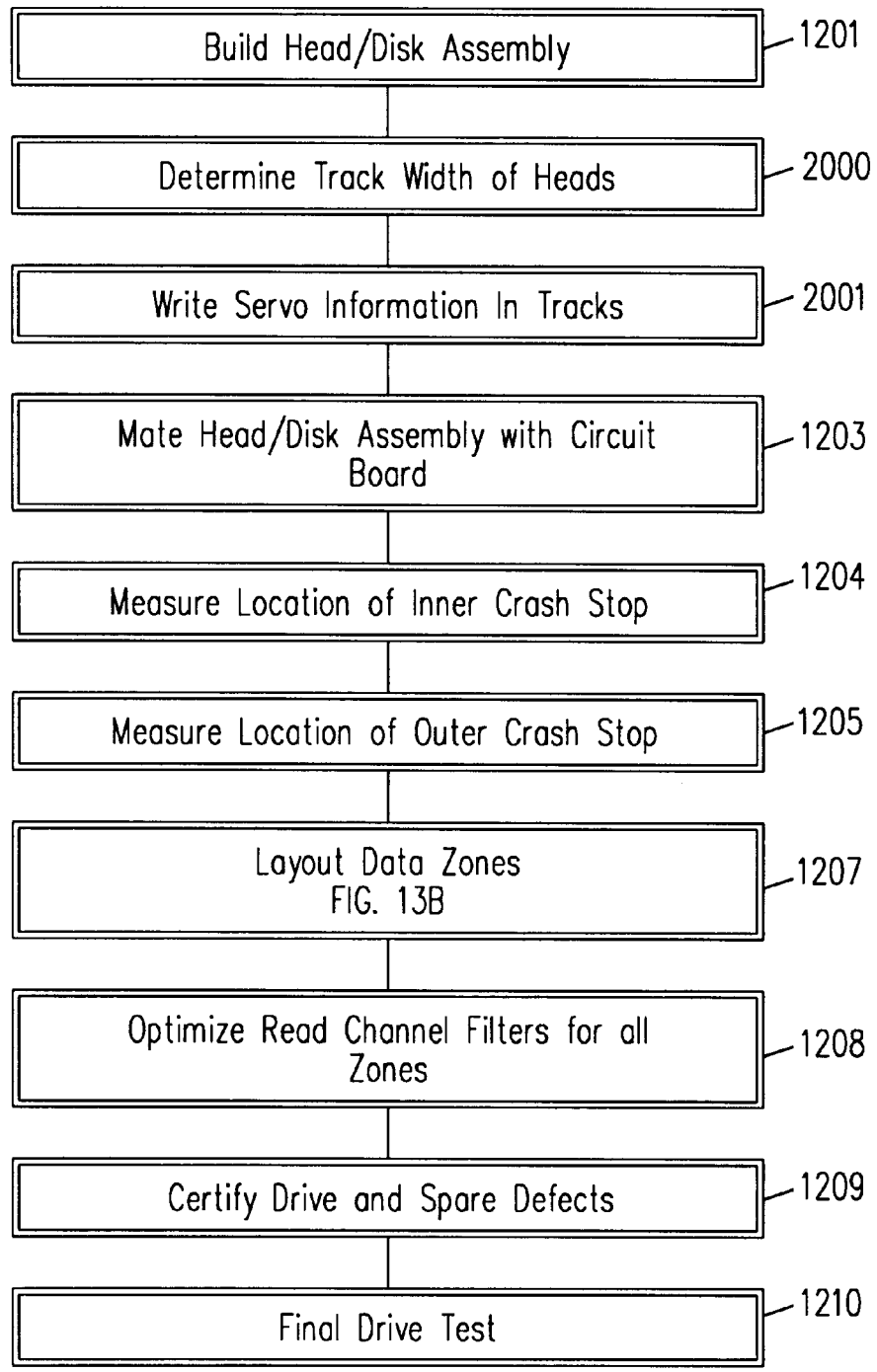

A further embodiment to the present invention is illustrated in FIG. 21. The process in FIG. 21 is similar to that used in FIG. 12B, with the exception of steps 2000 and 2001.

Figure 22:
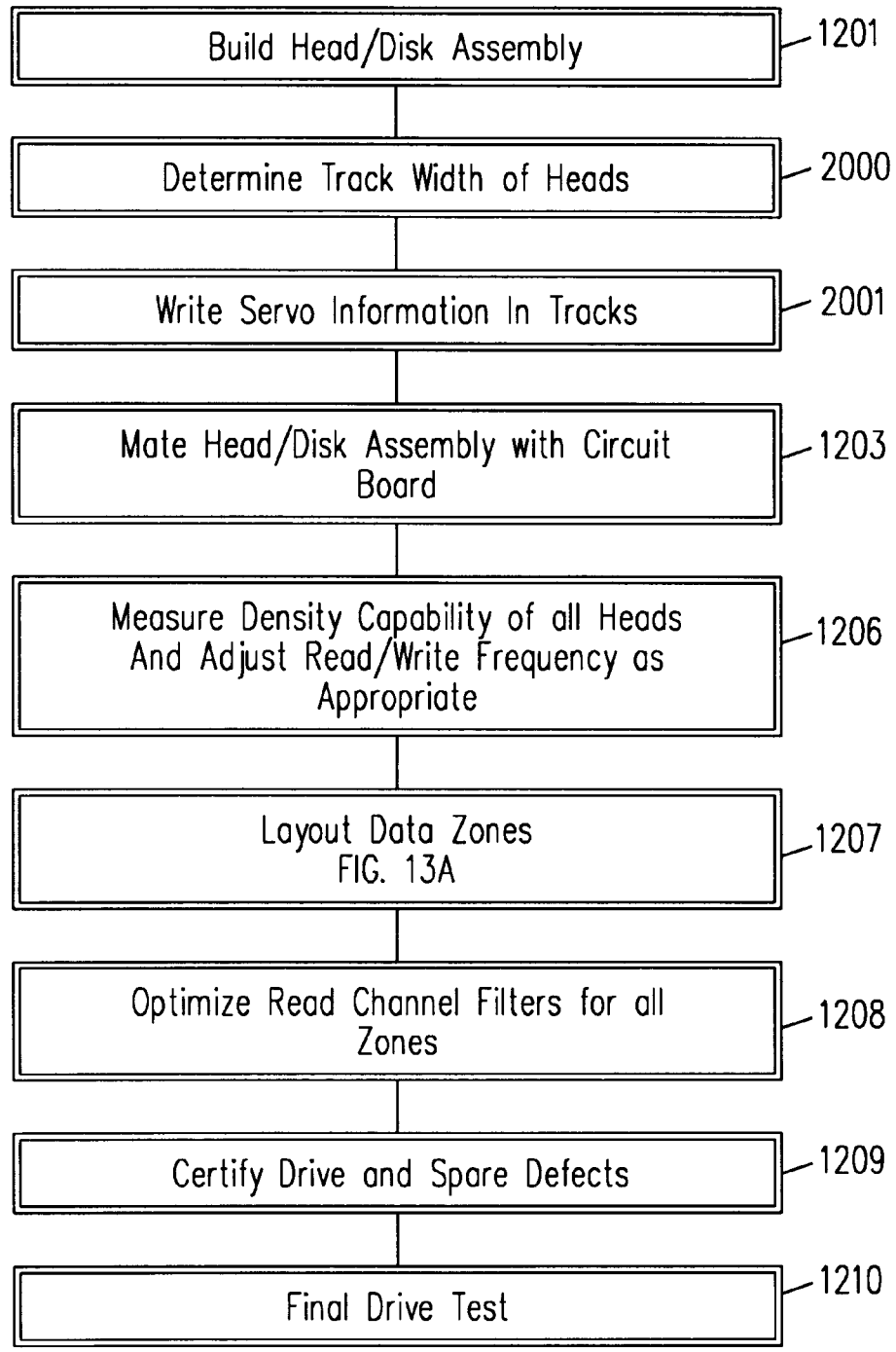

A further embodiment to the present invention is illustrated in FIG. 22 which is a flow chart of an assembly process very similar to that utilized in FIG. 12C discussed previously. The steps in FIG. 22, from the standpoint of determining the track width of the heads and writing servo information in servo tracks, correspond to those used in the flow charts in FIG. 20 and FIG. 21. The remaining steps in FIG. 22 are the same as those described above in respect to FIG. 12C and therefore further explanation is not required.

Figure 23:
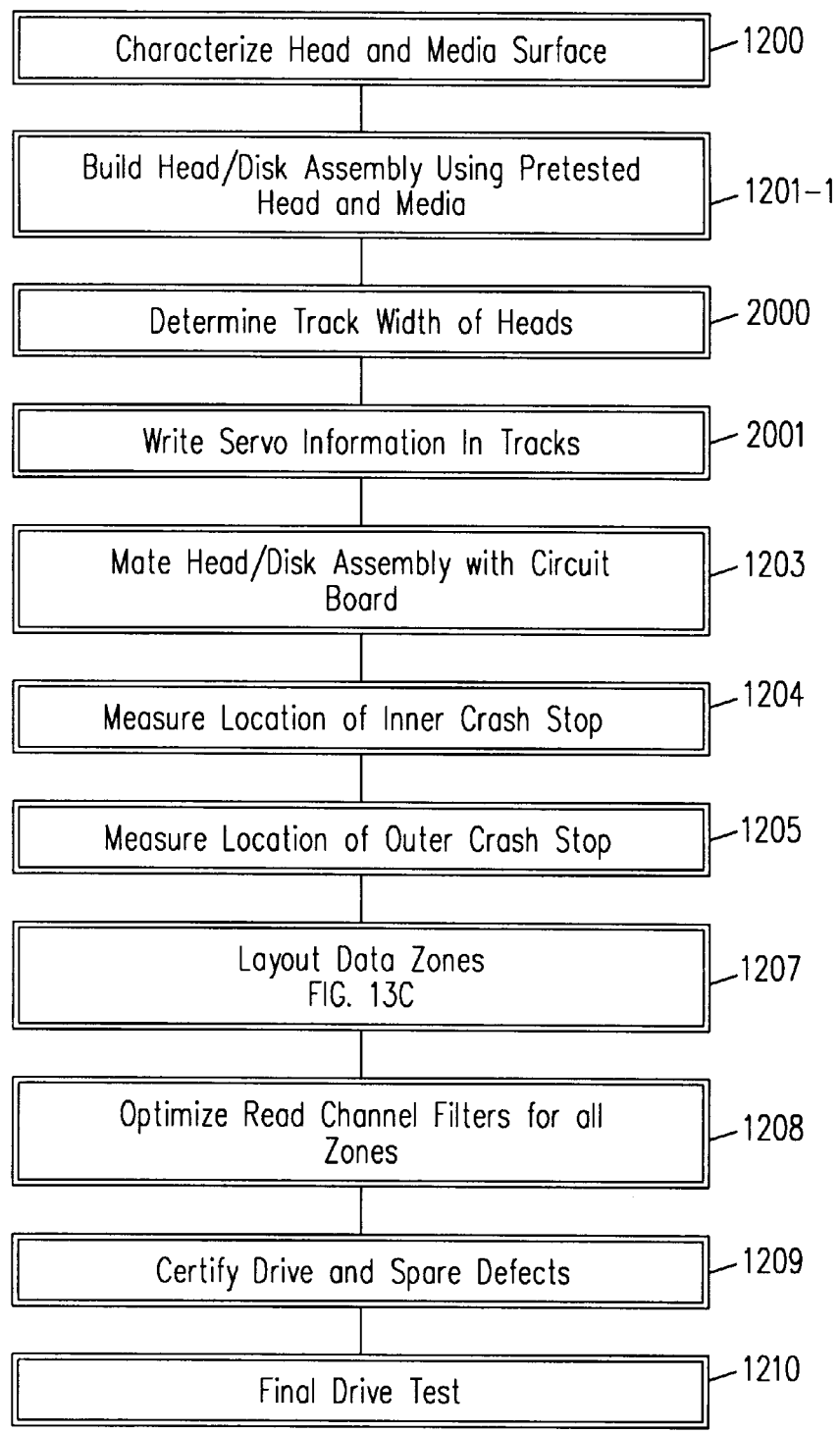

Yet another embodiment in the present invention is illustrated in the flow chart of FIG. 23. As with FIGS. 20–22, the track width of the heads is determined after assembly of the HDA, the track pitch for the stack determined and the servo tracks written with a pitch appropriate for the heads in the write servo information in track step 2001. By comparing FIG. 23 with FIG. 12D, it will be noted that with the exception of step 2000 and step 2001, the remaining steps are common in both the flow charts in these figures.

Figures 24, 25:
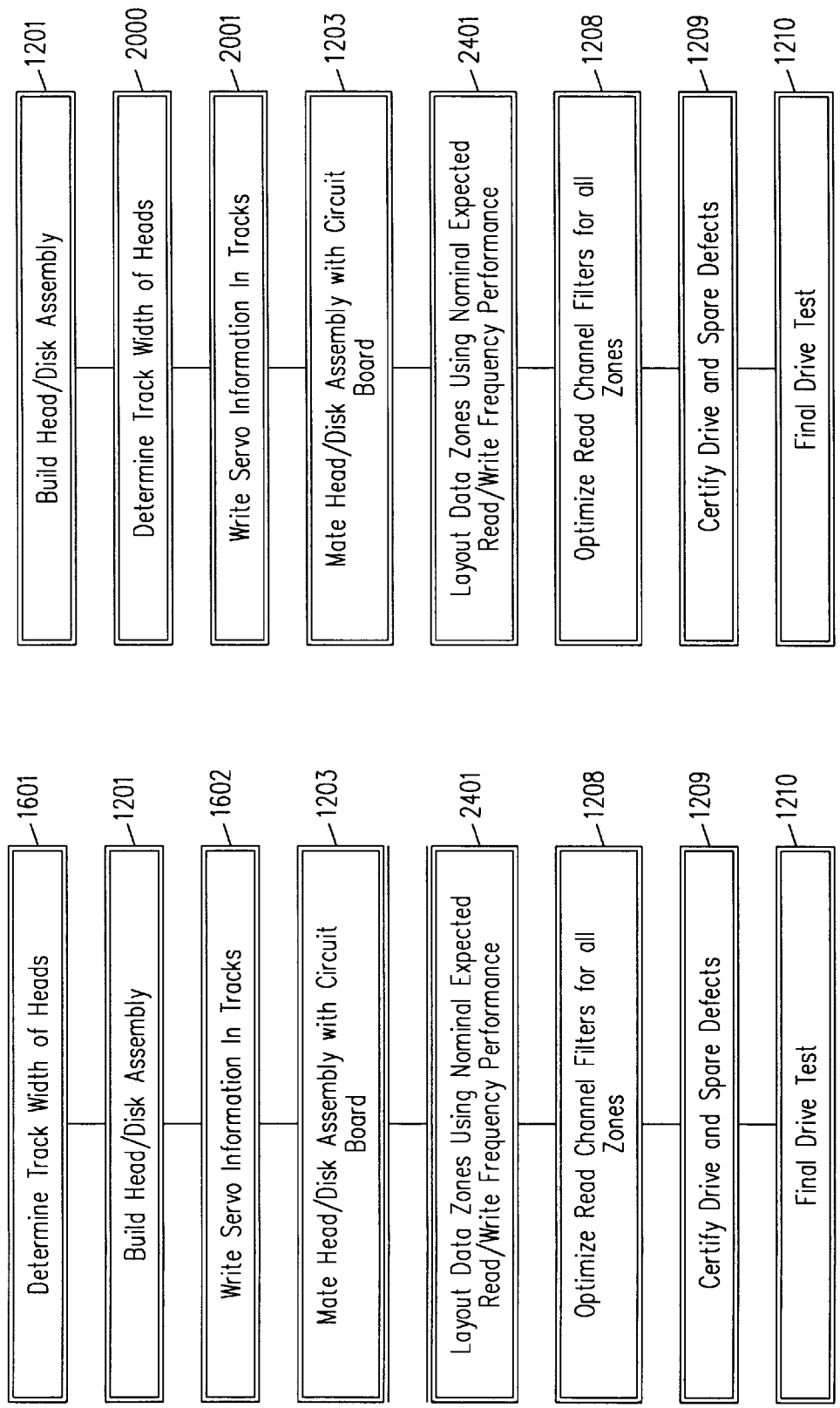
FIGS. 24 and 25 illustrate flow charts of two embodiments of the present invention utilizing read/write transducer track width as a parameter in assembly of disk drives.
Figure 26:
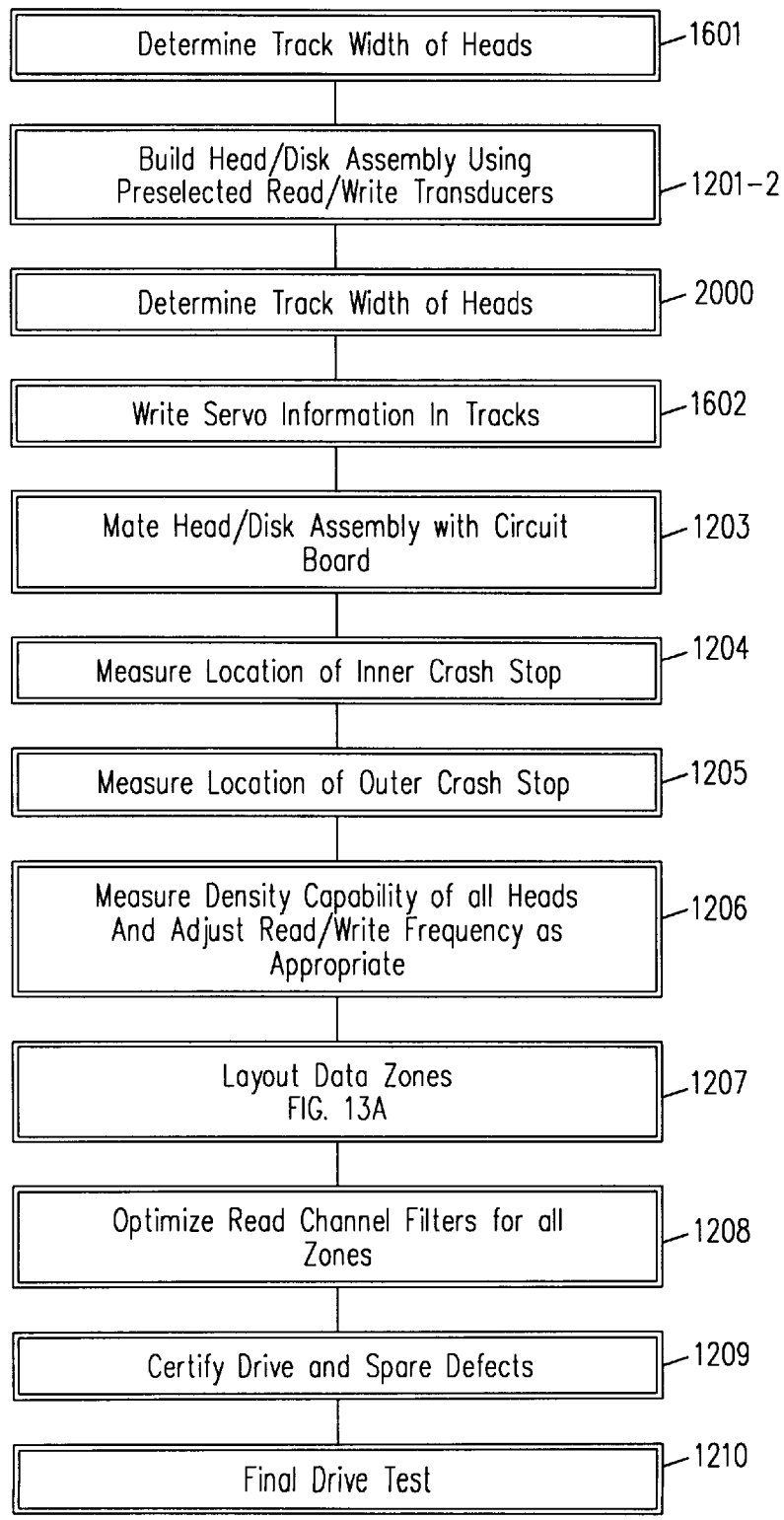
FIGS. 26–30 illustrate the flow charts at additional embodiments of the present invention.
Figure 27:
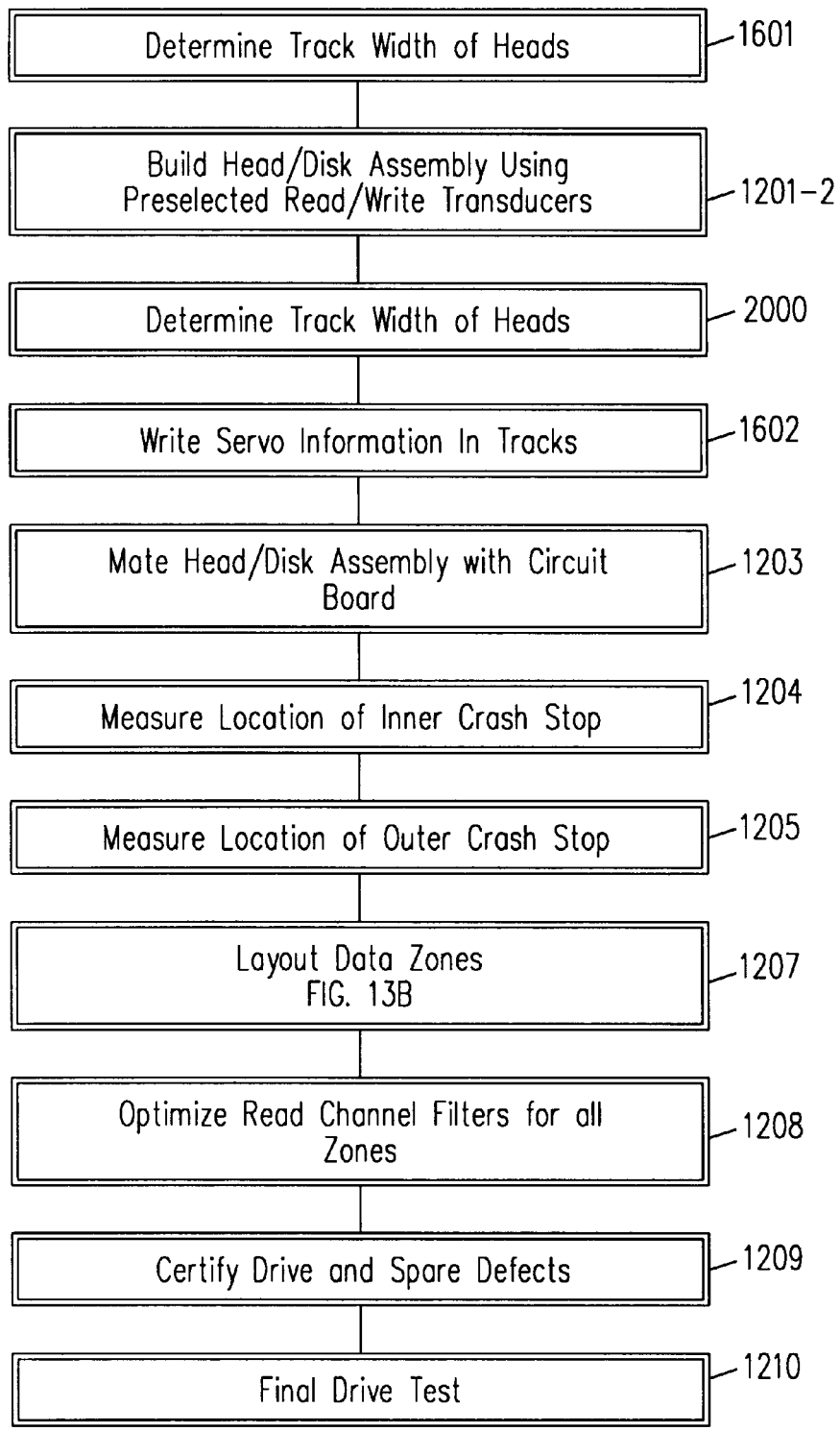
Figure 28:
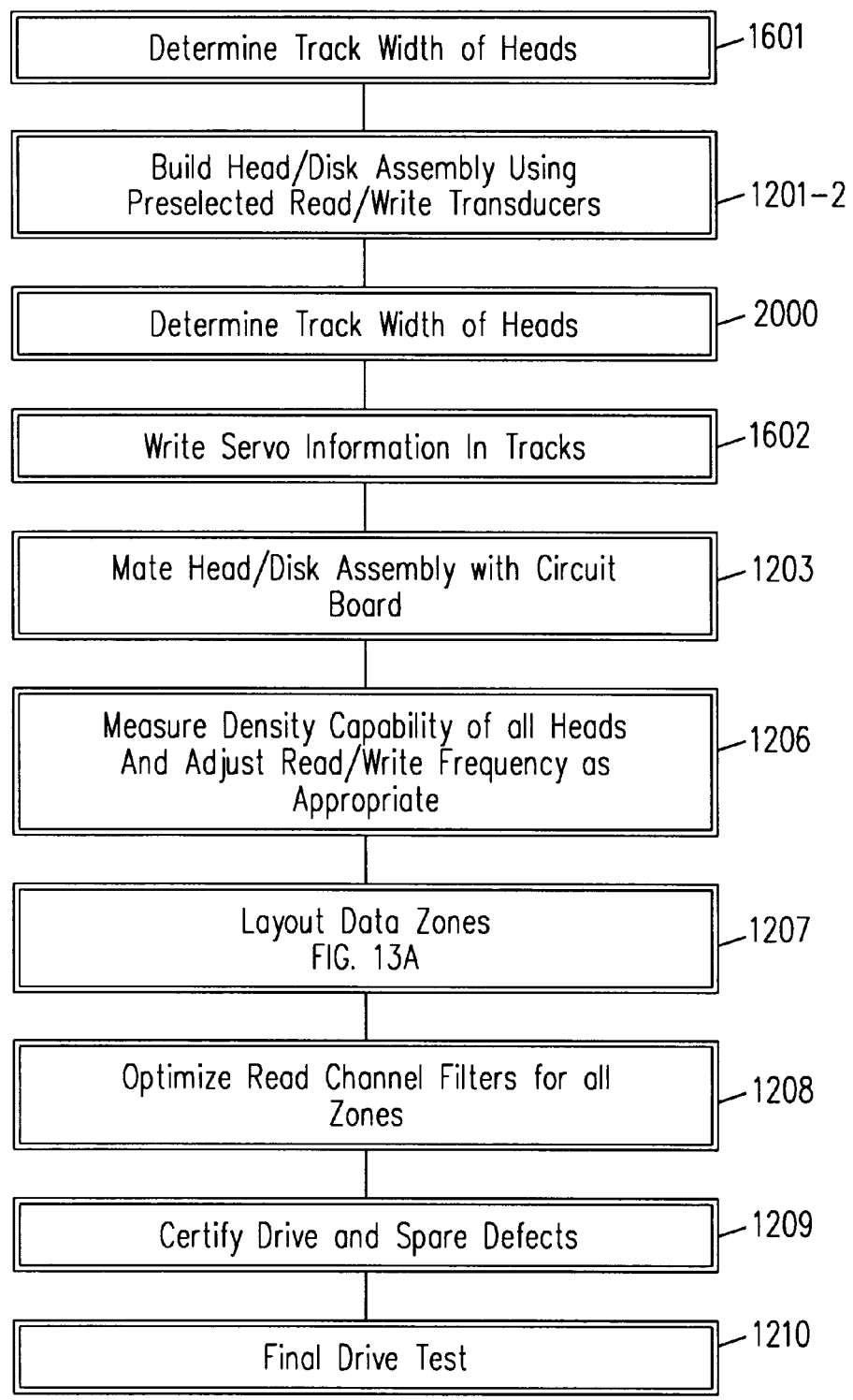
Figure 29:
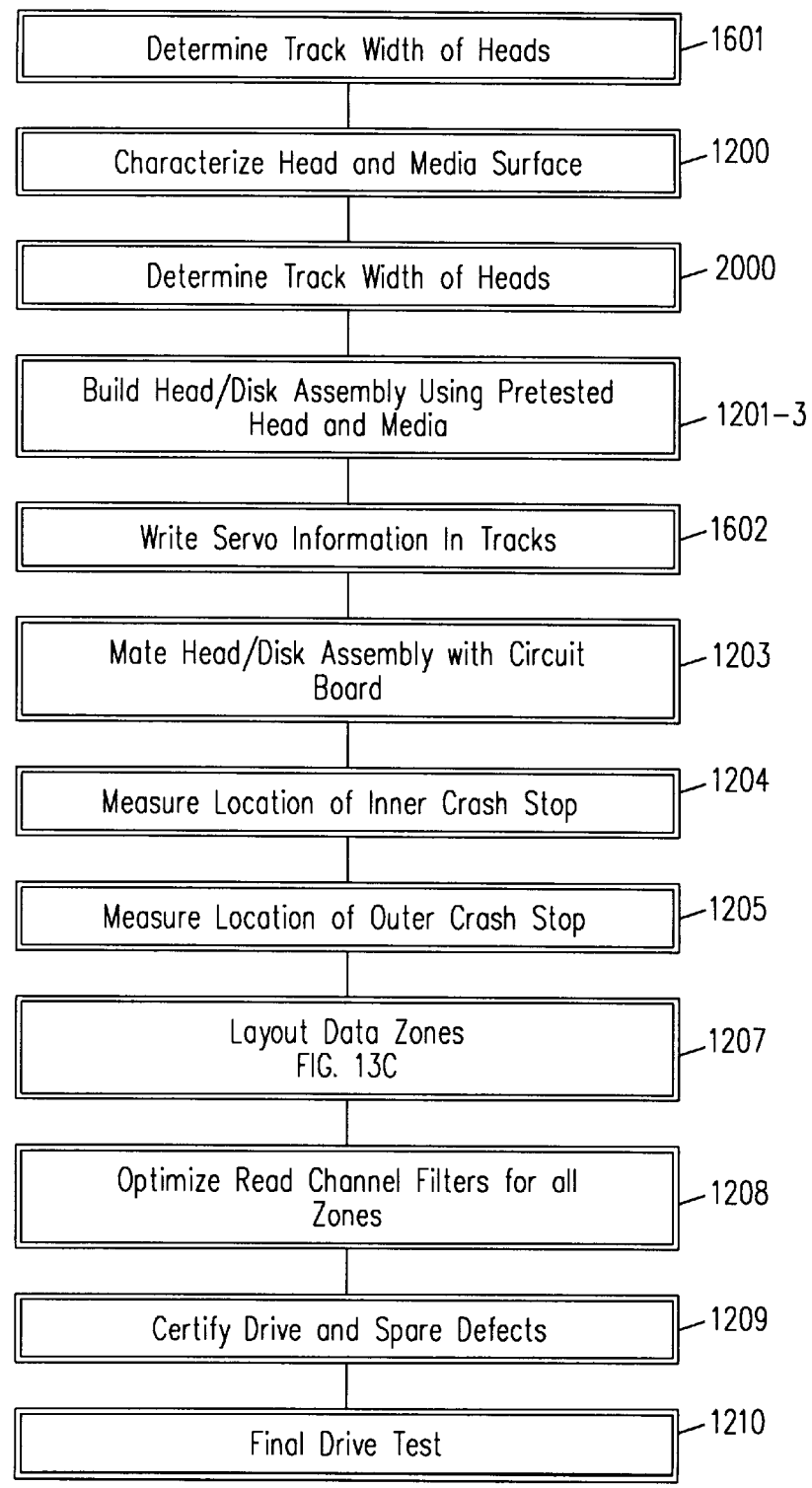
Figure 30:
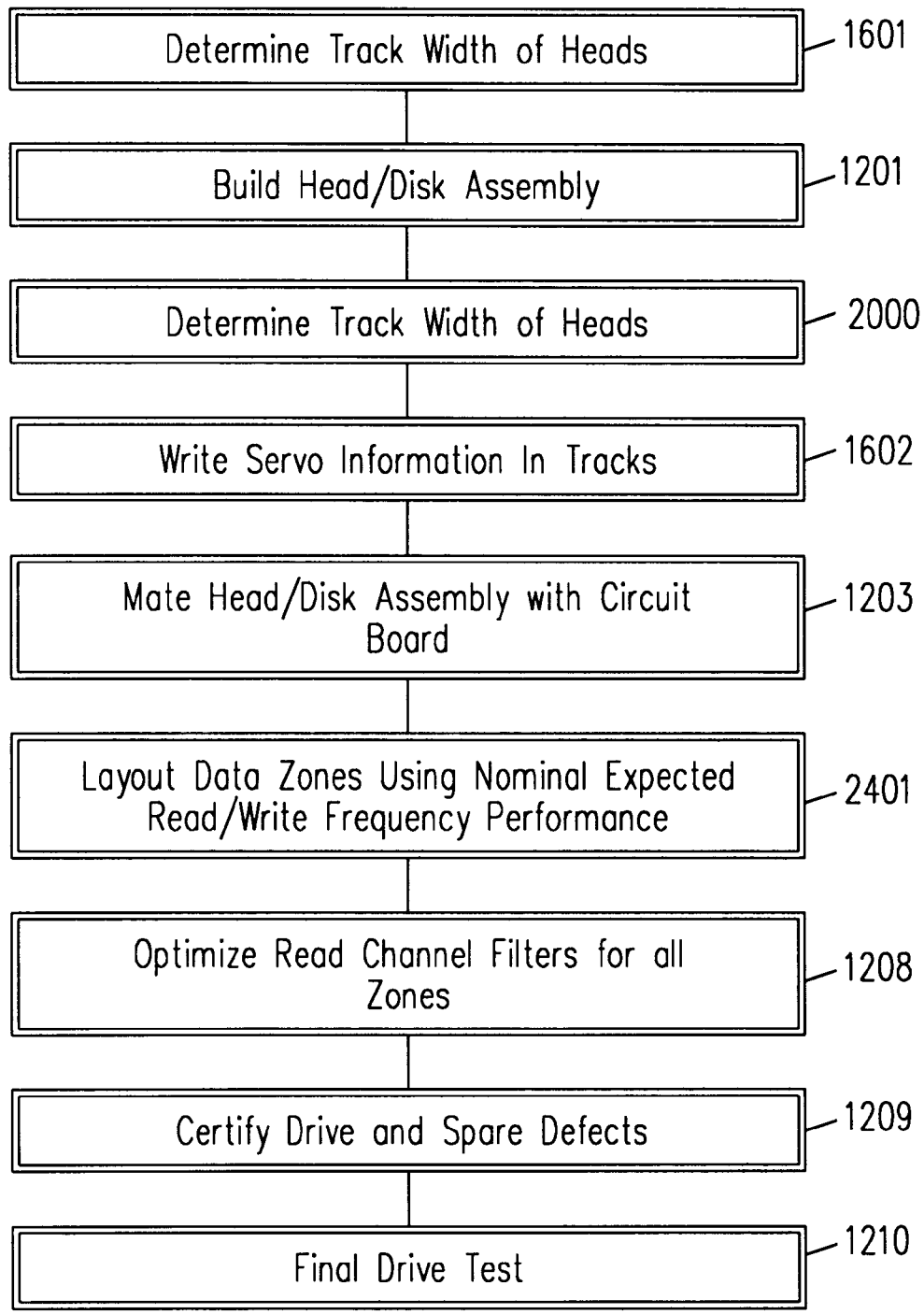

In the preceding examples, the adaptive zone recording technique are utilized to provide variable zone layout depending on the measured read/write frequency performance of the heads used in the disk drive. And in some embodiments, the additional factor of track width of the heads which utilized in conjunction with the adaptive zone layout technique. FIGS. 24 and 25 illustrate further embodiments in the present invention in which the track width of heads used in a disk drive are measured and the track pitch established based on the measured track width of the heads. Using this technique, an improvement in the recording capacity in disk drives may be achieved even though the recording density capability of the heads is not utilized as a factor in laying out the recording zone.

Turning to FIG. 24, in the first step (1601) the track width characteristic of the heads is determined by either the electrical technique or the optical technique described above or another technique. Next the HDA is assembled, followed by the writing of servo information in tracks using the measured track width to establish the track pitch. The HDA is then mated with the circuit board (step 1203) and a layout for the data zones is made using the nominal expected read/write frequency performance for heads of the type used in the disk drive under assembly. In step 2401, the prior art technique of having all of the zone boundaries aligned from surface to surface and disk to disk is utilized.

Next the read channel filters are optimized for all zones (step 1208), the drive certify and spare defects step is performed (1209) and final drive test is performed (1210).

In an alternative assembly procedure to those in the above examples in which disk drives are assembled using read/write transducers which are pre-tested for gap width and grouped for use in a disk drive based on gap widths falling with preselected ranges (for example, FIGS. 16–19 and 24), the further step of testing the read/write transducers for track width after HDA assembly is performed. Referring to FIGS. 26–30, assembly flow charts are illustrated showing the alternative procedures in which steps 1601 and 2000 are utilized in the same assembly process. Step 2000 (Determine Track Width of Heads) is performed as described above in the section headed Track Width Measurement After HDA Assembly. Using the second track width measurement in the process ensures that the appropriate track pitch is used and avoids the problem which would arise if the pre-tested read/write transducers were incorrectly marked, or otherwise designated, with an incorrect track width. It will of course be appreciated that the processes illustrated in FIGS. 16–19 and 24 do not disclose, nor require, the dual track width testing procedure.

The flow chart of FIG. 25 illustrates another embodiment of the present invention in which the track width of the heads is determined after assembly of the HDA. The track width determination of step 2000 is described above, as is the step of writing of servo information in tracks (2001). The remaining steps in FIG. 25 are the same as those used in FIG. 24.

Figure 5A:
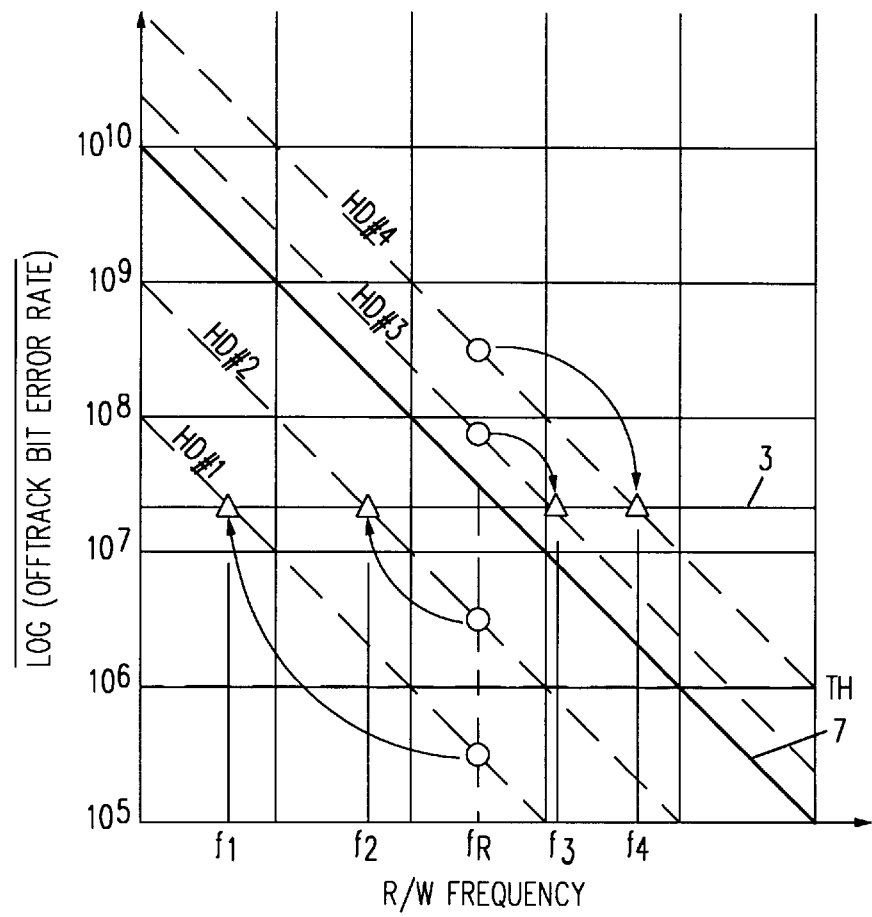
FIG. 5A illustrates graphically the results of a hypothetical head performance test and illustrates one change of operating frequency for one zone layout in accordance with the invention.

To illustrate one aspect of the present invention in which the recording density of the heads are adjusted to provide improved overall recording density, reference is made to FIG. 5A. In FIG. 5A, a four-head disk stack is under test and as illustrated by the circles along the vertical axis $f_R$, one head (HD#1) exhibits an LOBER of approximately 5.5 (below the minimum acceptable LOBER threshold TH=6), head HD#2 is at approximately 6.5, head HD#3 at 7.9, and head HD#4 at approximately 8.5. The performance of the heads may be measured at any track location across the recording surface to obtain the LOBER for each of the heads at frequency $f_R$, however the middle track of the disk surface has been found to provide a desirable location for obtaining the performance figures. Further information on a technique for determining the bit error rate of a transducer may be found in U.S. patent application Ser. No. 08/124,322, filed Sep. 20, 1993 by Bruce D. Emo, entitled "Method of Optimizing Operations of a Disk Drive", now U.S. Pat. No. 5,408,367 issued Apr. 18, 1995. The '322 application is commonly owned by the assignee of this application and is incorporated herein by reference in its entirety. Alternatively, other techniques of measuring head performance may be used in practicing the present invention.

Using the prior art criteria of fixed recording zones based on the traditional formatting, the drive would fail because one of the heads did not perform adequately to meet the minimum criteria TH. Applicants have found, however, that by reducing the read/write frequency of the lesser performing heads and increasing the read/write frequency of the better performing heads, a significant improvement in overall recording density is achieved. The improvement in recording density may be used to raise capacity, or to improve the yield.

Referring to FIG. 5A, it will be noted that in assigning the operating frequency for the heads the average of the LOBER is calculated and the operating frequency of each head is moved such that its operating frequency provides an LOBER located on the line of average performance for the group. The new frequency for each head is indicated in FIG. 5A by the triangles positioned along horizontal line 3. In this example, the LOBER average value is approximately 7.1. By adjusting the read/write frequency of the better performing heads to a higher frequency, the capacity lost by lowering the read/write frequency of the poorer performing heads is regained. Although in the example of FIG. 5A the frequencies of the heads are adjusted to all have the same LOBER value, that is not required in practicing the present invention. The advantages of the present invention may be obtained by raising the operating frequency of better performing heads in an amount sufficient to offset the loss of storage which results from lowering the operating frequencies of one or more heads which are below the minimum acceptable threshold. Or stated differently, it is not necessary that the operating frequency for each of the heads necessarily be adjusted so that they have the same LOBER value. In FIG. 5A, the new read/write frequencies for the heads have been adjusted to provide maximum margin for the operating performance above the minimum acceptable level of TH. For example, in FIG. 5A, it will be appreciated that the margin is the difference between the log offtrack bit error rate value at line 3 and the minimum acceptable level TH. In FIG. 5A, the dashed diagonal lines having the head numbers adjacent thereto are the performance curves for the respective heads. As indicated in FIG. 5A, moving the read/write frequency of the heads results in a new performance value which falls along their respective performance curves. Other variations in the selection of the new read/write frequencies for the heads may include moving their operating frequencies to frequencies other than ones which would result in their LOBER values being the same.

Figure 5B:
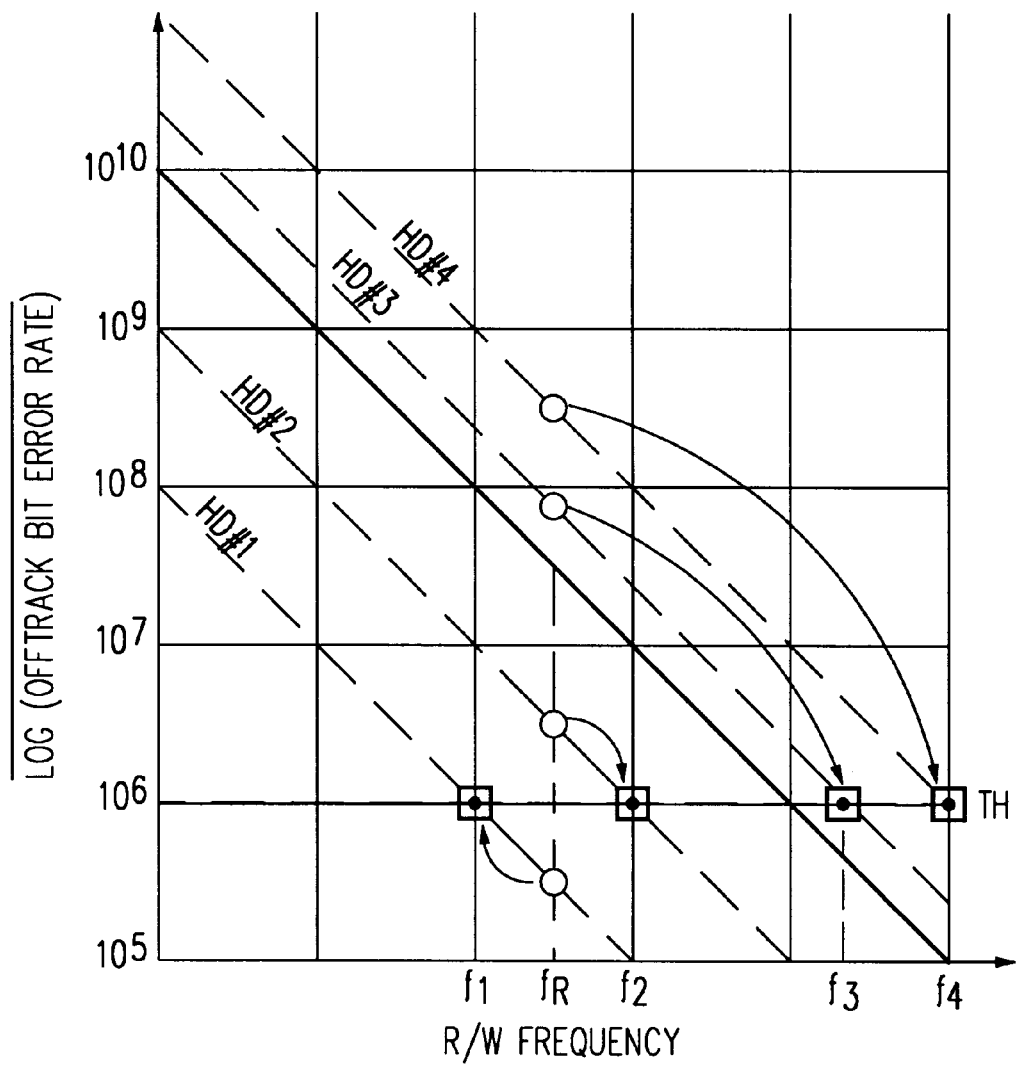
FIG. 5B illustrates graphically another change of operating frequency of heads and another zone layout in accordance with the invention.

Alternatively, adjustment of the read/write frequency of the heads may be made to provide maximum overall capacity while still achieving the minimum acceptable bit error rate. Referring to FIG. 5B, the read/write frequencies of heads HD #1 through HD #4 have been adjusted with respect to their original test position (illustrated in FIG. 3). The arrows in FIG. 5B illustrate the movement from the original test position at $f_R$ to the new frequency illustrated by the rectangles. It will be noted that the read/write frequency for head #1 has been lowered while the read/write frequency for each of the other heads has been increased, while still maintaining the minimum acceptable LOBER. The technique illustrated in FIG. 5B may be utilized, for example, where maximization of storage capacity is desired when, for example, the usable stroke is below what might otherwise be acceptable using prior art techniques, to provide the desired capacity when fewer than the expected number of data tracks are available.

In the above examples of characterizing the performance of the heads, a single track was utilized for checking performance at frequency $f_R$ and the performance of other locations was calculated based upon mathematical models which will be described below. Alternatively, the performance of each of the heads could be ascertained at a plurality of the locations and that performance data used instead of the mathematical models.

Based on the read/write frequency for each of the heads, the zone boundaries for its associated surface are calculated. The distance from the centerline of the disk to the inner radius of a zone boundary may be calculated using the following formula:

$$\text{Frequency Ratio}_N = (a)ir^2 + (b)ir + c \qquad \text{(eq. 5)}$$

where:
ir=inner radius of the zone measured from centerline of disk a=−0.002119
b=0.12013
c=−0.4343
N=zone for which boundaries are being calculated The values for a, b, and c given above have been determined based upon a nominal head performance as determined from an analysis of the performance curve of the nominal head. Alternatively, a performance curve for each head used in the drive may be generated and the unique values for a, b, c generated to more precisely set the zone boundaries for the head-disk combination. It has been found, however, that the approximation in the above formula is generally sufficient for zone boundary layouts. The inner radius ir for the zone is determined by solving equation (5) based on the value of the Frequency Ratio$_N$ for zone N. Frequency Ratio$_N$ is determined by dividing the NRZ frequency for the target zone (described more fully below in connection with Tables 1 and 3 in the example of the zone boundary calculations) by the adjusted read/write frequency $f_{Ref}$ for the read/write head. The magnitude of the Frequency Ratio is determined by the following formula:

$$\text{Frequency Ratio}_N = \frac{\text{Target Zone Freq}_N}{f_{Ref}} \qquad \text{(eq. 6)}$$

where: $f_{Ref}$ = adjusted read/write frequency

Target Zone Freq$_N$ =

NRZ frequency based on Target Zone Table

As pointed out above, the Target NRZ frequency is determined from the zone boundary table. The adjusted read/write frequency $f_{Ref}$ is the head performance at a location on the disk (for example as pointed out above at the center track of a surface). The value of $f_{Ref}$ is based on adjusted read/write frequency for the read/write transducer. For example in FIG. 5A the read/write frequency to be used for head HD#1 has been moved to $f_1$ which is approximately 24.12 Mhz, and this is the value for $f_{Ref}$ utilized for equation (6) in determining the Frequency Ratio based on the NRZ frequency from the zone boundary table.

A specific example is found below in which the zone boundaries for head HD#1 in FIG. 5A have been computed using the above formulas to arrive at the zone boundaries illustrated in Table 3.

In determining the Target NRZ Frequency for the zones, a table of target zone sizes (for example Table 1 below), is generated using techniques well known to those skilled in the art. From the target zone size, the Target zone NRZ frequency is determined based on known prior art techniques. With regard to the NRZ frequency for the zones, those are illustrated for example in Table 3 below.

From the above, it will be appreciated that the zone boundaries for each of the four heads (HD#1–HD#4) will be different since they each have a different $f_{Ref}$ frequency.

Figures 6, 7:
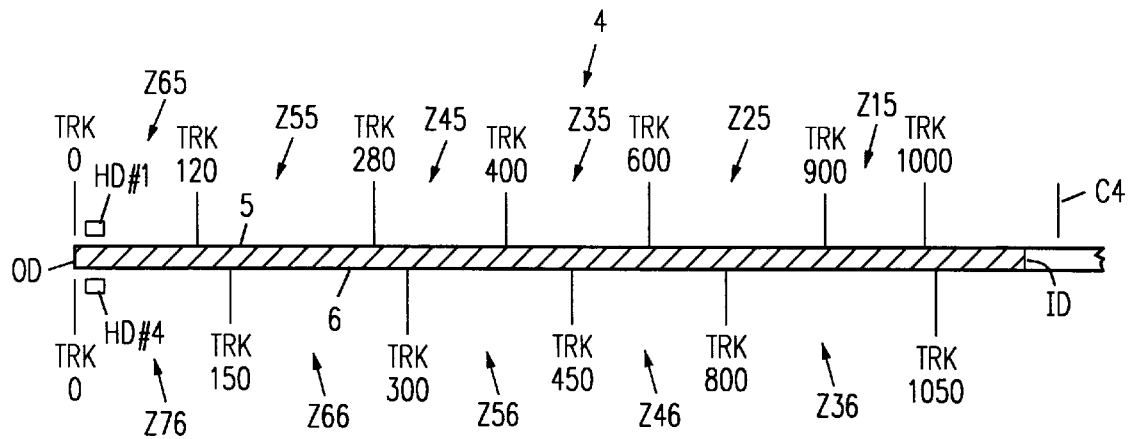
FIG. 6 illustrates a hypothetical zone layout for first and second surfaces of a magnetic recording disk.
FIG. 7 illustrates a lookup table for two heads, indicating by track number for each head the zone in which the track is located.

FIG. 6 provides an illustrative, hypothetical overview example of zone boundaries established for the upper and lower surface of a disk 4 using the variable zone layout in accordance with the present invention. The layout is based on the philosophy of target zones, which will be described in detail below. More particularly, referring to FIG. 6 which illustrates in a cross-sectional view slightly more than one-half of the disk with the inside diameter indicated by ID and the outside diameter indicated by OD, recording zone boundaries are illustrated. For example, in FIG. 6 read/write head HD#4 is illustrated above surface 6 and read/write head HD#1 is shown above surface 5. It will of course be appreciated that these heads are highly enlarged for illustrative purposes. Since each of the zone boundaries on the surfaces will be at different locations in view of the different operating frequencies of the head for the respective surface as described below, the indication of the zones by two numbers following a Z is utilized. In this example, the convention in the numbering system provides that the first number following the Z is the zone and the second number is the surface. For example, on surface 5, Z25 indicates zone 2 on a surface 5. A similar convention is utilized for the lower surface where the second digit indicates surface 6 and the first digit denotes the zone number. On upper surface 5 the zones Z15, Z25, Z35, Z45, Z55 and Z65 have been established based on the above indicated formula for zone radius for read/write head HD#1 (FIG. 5A) having a read/write frequency $f_1$ of about 0.8 $f_R$. While for read/write head HD#4, five zones, Z36, Z46, Z56, Z66, and Z76 are established, read/write head HD#4 operating at frequency $f_4$ of about 1.5 $f_R$. The track numbers are indicated in FIG. 6 by TRK followed by number of the track.

It will also be appreciated by reference to FIGS. 6 and 7 that track 280 on surface 5 is in zone 4, whereas track 280 on surface 6 is located in zone 6. It will be appreciated from FIG. 6, with read/write head HD#1 operating at the lower frequency than read/write head HD#4, the location of zone #3 (indicated Z36) on surface 6 does not coincide with the location of zone #3 (indicated Z35) on surface 5. Although in practice the entire surface of the disk 4 is not used from ID to OD for storage of data, for simplicity of illustration the zones are laid out using that entire space. It will be appreciated that the zone boundary pattern on surface 5 is different than the zone boundary pattern on surface 6. More particularly, on surface 5 the pattern involves the use of zones 1 through 6, while on surface 6, zones 3 through 7 are used in the pattern. As described above, head HD#4 is capable of operating satisfactorily at a higher range of operating frequencies. This permits the use of a group of higher frequency zones, resulting in the layout illustrated in FIG. 6. It will also be appreciated by reference to FIG. 6 that, as viewed vertically (that is parallel to center line C4), the zone boundaries for like zones are offset. For example, the boundaries for zone 3 (indicated Z36) on surface 6 are offset from the boundaries of zone 3 (indicated Z35) on surface 5.

As will be appreciated by reference to FIG. 6, since the zone boundaries are not aligned from surface to surface, a specified track on one surface (for example track 280 pointed out above) may not necessarily be operating at a read/write frequency which is the same as the corresponding track for another surface. In the convention used herein, the higher the zone number, the higher the read/write frequency for that zone. More particularly, the read/write frequency for track 280 on surface 6 is higher than the read/write frequency for tack 280 on surface 5. Also, within each zone the read/write frequency is constant. Thus the read/write frequency for a particular track is dependent on the zone in which that track is located, and the zone layout varies from surface to surface in the adaptive zone technique of the present invention. Accordingly, a lookup table is utilized for each head-surface combination to store the track number-to-zone correspondence. Since the read/write frequency for each zone is set, the read/write frequency for the track is a given based on the zone in which the track is located. A lookup table, as illustrated in FIG. 7 is provided for tracks 0 through 1050 for surfaces 5 and 6 of disk 4. In the lookup table, the beginning track number is given for each zone on the head-surface combinations, for example read/write HD#4-surface 6, and read/write head HD#1-surface 5. Considering read/write head HD#4 as an example, tracks 0–149 are in zone 7, tracks 150–299 are in zone 6, and similarly continuing to final zone on surface 6, zone 3, which contains tracks 800–1050. The zone boundaries are calculated using the zone definition math described above.

The foregoing technique is in contrast to the prior art where the zone boundaries for all surfaces were aligned and a given track was in the same zone on all surfaces. Since in the prior art all zones and tracks on all surfaces coincided, only one table of zone boundaries (giving track-to-zone correspondence) was required.

Figure 8:
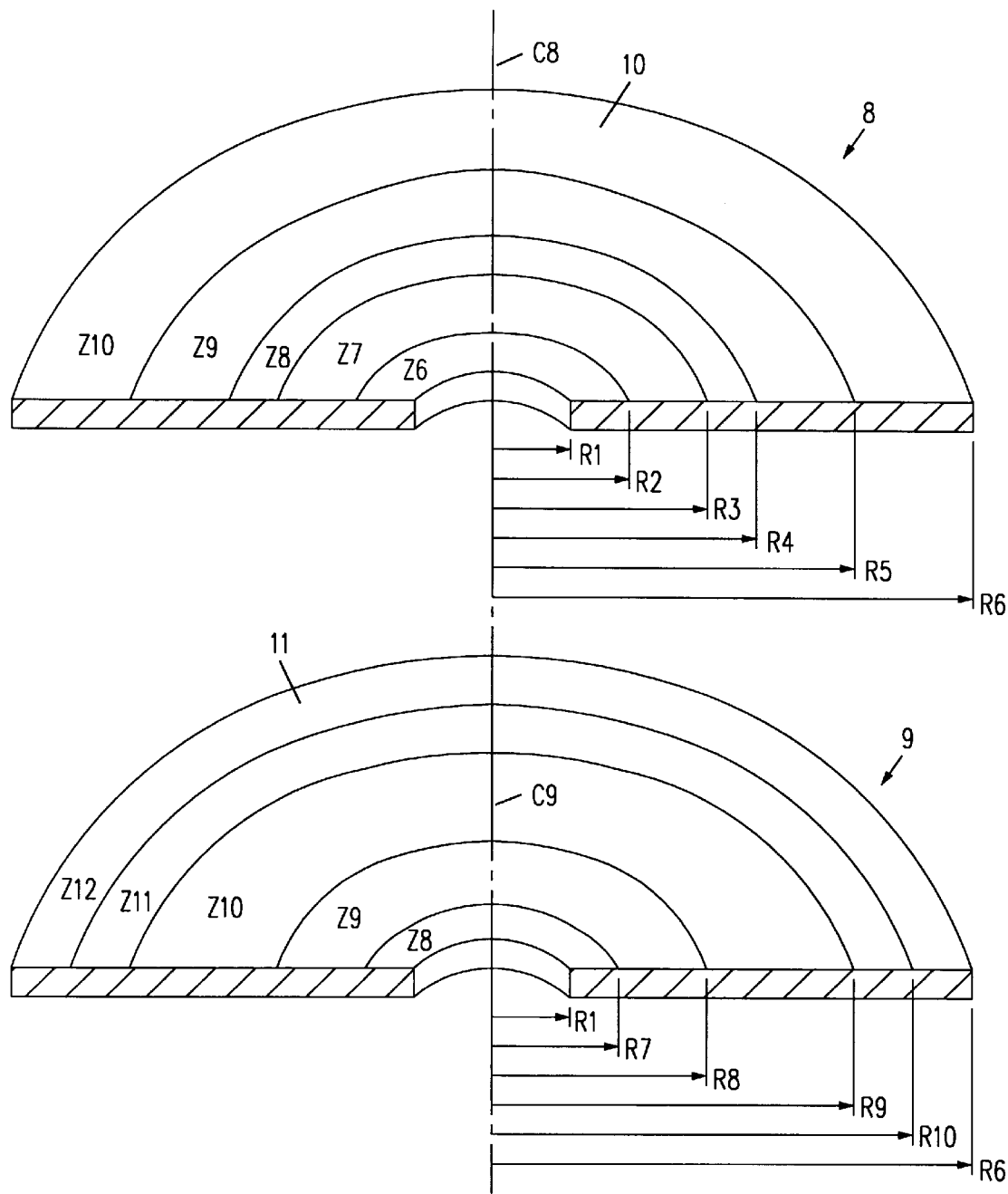
FIG. 8 illustrates a variable zone layout for a pair of coaxially positioned disks.

Referring to FIG. 8, a stack of disks, including disk 8 and disk 9, is illustrated, for simplicity, without components to rotate the disk nor with read/write transducers for reproducing information from the disks. Disks 8 and 9 include a magnetic coating on their respective surfaces for the record and playback of information. The center lines of disk 8 and 9 are indicated, respectively, by C8 and C9, and it will be appreciated that their center lines C8 and C9 are aligned. For simplicity, the zone boundaries are indicated only on the upper surface of the respective disks. Referring to disk 8, the boundaries of zones Z6, Z7, Z8, Z9 and Z10 are indicated with respect to radii from center line C8. For example, the inner and outer zone boundaries for zone Z7 are defined by distances R2 and R3, respectively. As illustrated, R6 indicates the outer diameter of disk 8. The zone boundaries have been established based on the math and Tables described herein, and illustrate a hypothetical result based on testing a read/write head to be used with surface 10. The read/write frequency utilized in the respective zones is unique for the zone and is established based upon factors, including head performance.

Referring to disk 9, the zones on surface 11 are indicated by Z8, Z9, Z10, Z11 and Z12. It will be noted that the layout of the zones on surface 11 is unique and is based upon a performance of the read/write heads to be associated with surface 11. The boundaries are determined based on the formulas and tables provided herein. The recording frequency in like-numbered zones for the disks is the same (for example the recording frequency in zone 8 of disk 9 is the same as that used in zone 8 of disk 8). In contrast to the prior art, the zone boundaries for disk 8 and disk 9 are not aligned, and also correspondingly located physical portions of the surfaces on the upper and lower disk (8) and (9), do not have the same recording frequency. For example, in lower disk 9 zone Z12 is at a different read/write recording frequency than the outer zone (Z10) in disk 8. A zone table such as that illustrated below, was used to layout the zone boundaries. Also, radii R2, R3, R4 and R5 are not equal to radii R7, R8, R9 and R10. In the figures, R1 indicates the inner diameter (ID) of the disks and R6 indicates the outer diameter (OD).

Figure 9:
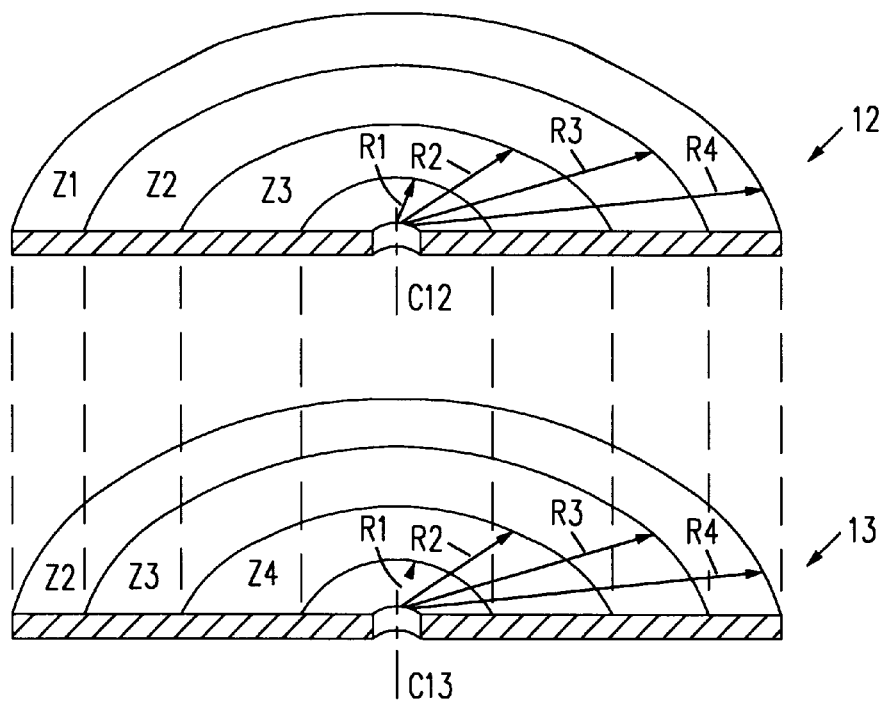
FIG. 9 illustrates zone layout for two coaxially positioned disks.

In another embodiment of the present invention, in contrast to the embodiment illustrated in FIG. 8 where the zone boundaries are not aligned, referring to FIG. 9 a second embodiment is illustrated where the recording zone boundaries for disk 12 and disk 13 are aligned as illustrated by the vertical dashed lines. However, for disk 12 and 13 the read/write frequency used for each of the correspondingly located zones has been established to be different value. For example, the outer zone in disk 12 is to be operated at recording frequency Z1. However on disk 13 the outer zone utilizes recording frequency Z2. In FIG. 9, as in the preceding figures, the zone boundaries are defined by the radii, and the zone number (for example, Z1) indicates the read/write frequency. As pointed out above, and as will be explained further below, the frequency for the zone is determined by, in part, the bit error rate of the head used with the associated surface.

Figure 11:
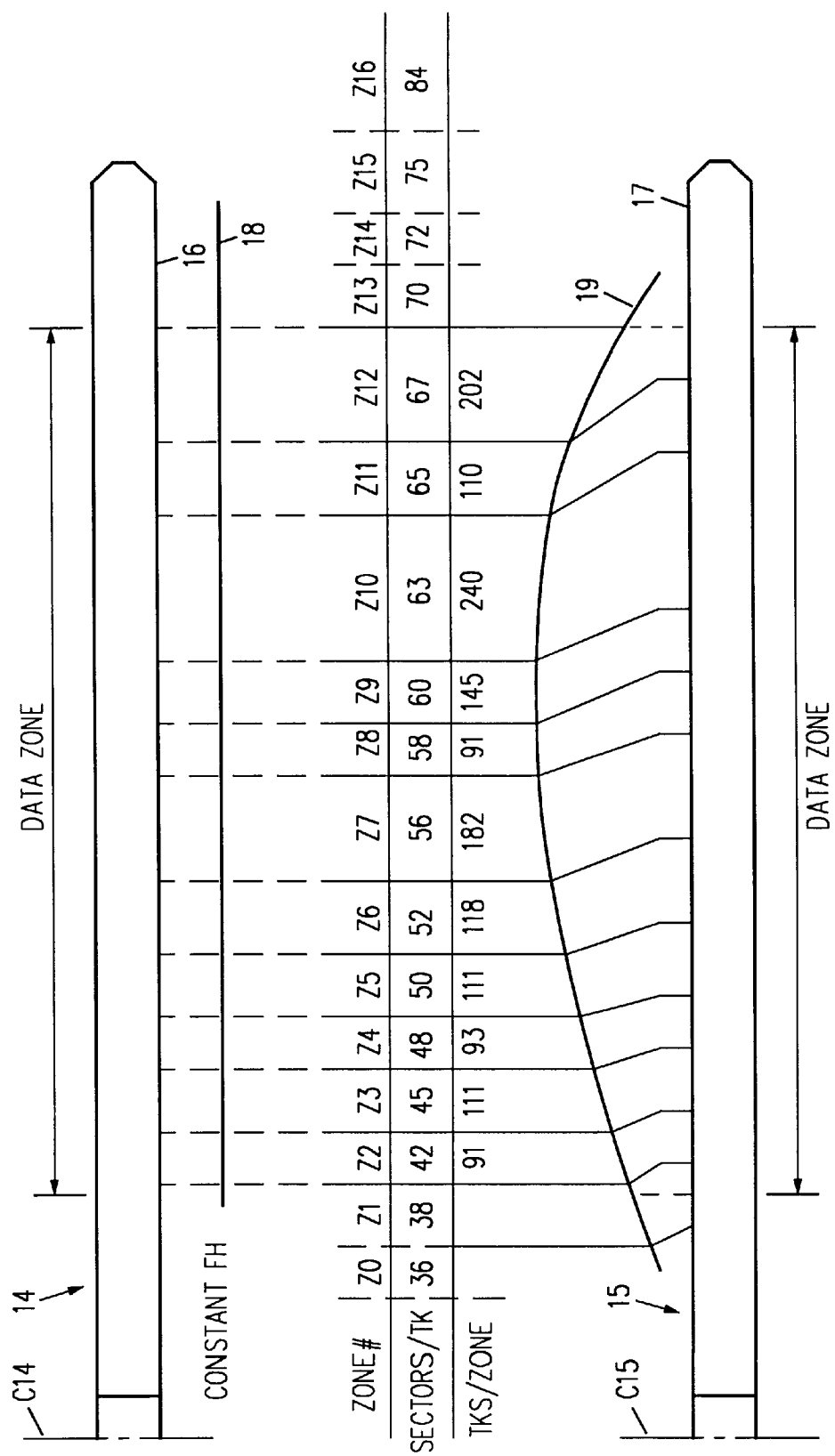
FIG. 11 illustrates zone layout in accordance with the present invention for a measured disk and head performance.

Specific examples of the implementation of the present invention are illustrated below in connection with 1.8 inch diameter disks. Examples are provided of how the zone boundaries are established using, among other things, a table of target zones and further tabulated information. Referring to FIG. 11, 1.8 inch diameter disks 14 and 15 are illustrated, each being shown with respect to its respective center line C14 and C15. The zone layout for disk 14 is with respect to surface 16 and the layout is made based on the utilization of a constant flying height read/write transducer. The constant flying height curve is indicated at 18. For simplicity, the associated read/write transducer for surface 16 is not shown. However the data obtained for determining the zone boundary layout was taken, for example using the above described technique of moving the read/write transducer to the center of disk 14 and obtaining performance measurements as described above.

With respect to disk 15, the zone layouts are indicated based on the use of a variable flying height read/write transducer (not shown). Curve 19 indicates the relative flying height of the transducer with respect to surface 17 of disk 15. The usable data zone indicated for disks 14 and 15 was determined based on the head performance and use of the zones defined in the target zone size table included below as Table 1. Among the factors included in the calculation of zone boundaries is the rotational speed of the disk, which in these examples is 4500 RPM.

TABLE 1

TARGET ZONE SIZES

| Zone: # | Sectors/Track | Tracks | Sectors/Zone |
|---|---|---|---|
| 0 | 35 | 0.0 | 0 |
| 1 | 37 | 0.0 | 0 |
| 2 | 41 | 90.3 | 3702 |
| 3 | 44 | 110.9 | 4879 |
| 4 | 47 | 92.2 | 4331 |
| 5 | 49 | 111.1 | 5442 |
| 6 | 51 | 118.3 | 6032 |
| 7 | 55 | 181.8 | 9989 |
| 8 | 57 | 91.4 | 5212 |
| 9 | 59 | 145.0 | 8552 |
| 10 | 62 | 240.3 | 14900 |
| 11 | 64 | 110.2 | 7055 |
| 12 | 66 | 202.3 | 13350 |
| 13 | 69 | 0.0 | 0 |
| 14 | 71 | 0.0 | 0 |
| 15 | 74 | 0.0 | 0 |
| 16 | 83 | 0.0 | 0 |
| 17 | 89 | 0.0 | 0 |
| 18 | 92 | 0.0 | 0 |
| 19 | 95 | 0.0 | 0 |
| 20 | 97 | 0.0 | 0 |
| 21 | 99 | 0.0 | 0 |
| 22 | 104 | 0.0 | 0 |
| 23 | 107 | 0.0 | 0 |
| Total Sectors | | | 83445 |
| Surplus Sectors | | | −0.00 |

Based on the head performance for head HD #1 to be associated with disk 14, it was been determined that target zones 2 through 12 should be utilized for data storage. Referring to FIG. 11, it will be noted that the zone layout is indicated using zone number, sectors per track and tracks per zone. Additional considerations are required with regard to the conversion between, for example, number of tracks indicated in Table 1 (arrived at by calculation), and the number of tracks actually used. Table 2 below shows the adjustment made to make the number of tracks in the zones an integer.

TABLE 2

ROUNDING ADJUSTMENT

| Sectors/ track | Tracks: calc'd | Tracks | Sectors/ zone |
|---|---|---|---|
| 35 | 0.0 | 0 | 0 |
| 37 | 0.0 | 0 | 0 |
| 41 | 90.3 | 91 | 3731 |
| 44 | 110.9 | 111 | 4884 |
| 47 | 92.2 | 93 | 4371 |
| 49 | 111.1 | 111 | 5439 |
| 51 | 118.3 | 118 | 6018 |
| 55 | 181.6 | 182 | 10010 |
| 57 | 91.4 | 91 | 5187 |
| 59 | 145.0 | 145 | 8555 |
| 62 | 240.3 | 240 | 14880 |
| 64 | 110.2 | 110 | 7040 |
| 66 | 202.3 | 202 | 13332 |
| 69 | 0.0 | 0 | 0 |
| 71 | 0.0 | 0 | 0 |
| 74 | 0.0 | 0 | 0 |
| 83 | 0.0 | 0 | 0 |
| 89 | 0.0 | 0 | 0 |
| 92 | 0.0 | 0 | 0 |
| 95 | 0.0 | 0 | 0 |
| 97 | 0.0 | 0 | 0 |
| 99 | 0.0 | 0 | 0 |
| 104 | 0.0 | 0 | 0 |
| 107 | 0.0 | 0 | 0 |
| Total Sectors | | | 83447 |
| Sectors required: | | | 83445 |
| Surface surplus | | | 2 |

Referring to FIG. 11 and Tables 1 and 2, it will be noted that the first zone used for recording data is zone Z2, which includes 42 sectors per track and 91 tracks in this zone. Zone Z2 has a calculated number of tracks of 90.3 which for use has been rounded up to 91 tracks. Similar rounding occurs, as it will be noted, in other zones.

The physical locations of the inner and outer radius for each of the zones is illustrated in Table 3 below. The units for actual radius (the radius calculated by equations provided below), inner radius (ir), and outer radius (or) are in millimeters, measured from center line C14.

TABLE 3

Zone boundary calculations

| Zone # | Target NRZ freq | Freq ratio | Actual radius | Allowed ir | or | Zone angle |
|---|---|---|---|---|---|---|
| 0 | 15.33 | 0.64 | 11.07 | 12.80 | 12.80 | 0.00 |
| 1 | 16.29 | 0.68 | 11.82 | 12.80 | 12.80 | 0.00 |
| 2 | 17.17 | 0.71 | 12.14 | 12.80 | 13.42 | 1.30 |
| 3 | 19.20 | 0.80 | 13.42 | 13.42 | 14.17 | 1.60 |
| 4 | 20.32 | 0.84 | 14.17 | 14.17 | 14.80 | 1.33 |
| 5 | 21.21 | 0.88 | 14.80 | 14.80 | 15.55 | 1.60 |
| 6 | 22.22 | 0.92 | 15.55 | 15.55 | 16.35 | 1.71 |
| 7 | 23.23 | 0.96 | 16.35 | 16.35 | 17.57 | 2.82 |
| 8 | 24.65 | 1.02 | 17.57 | 17.57 | 18.18 | 1.32 |
| 9 | 25.31 | 1.05 | 18.18 | 18.18 | 19.15 | 2.09 |
| 10 | 26.26 | 1.09 | 19.15 | 19.15 | 20.73 | 3.47 |
| 11 | 27.63 | 1.15 | 20.73 | 20.73 | 21.46 | 1.59 |
| 12 | 28.16 | 1.17 | 21.46 | 21.46 | 22.77 | 2.92 |
| 13 | 29.41 | 1.22 | 23.54 | 22.77 | 22.77 | 0.00 |
| 14 | 30.30 | 1.26 | 25.96 | 22.77 | 22.77 | 0.00 |
| 15 | 31.90 | 1.32 | 99.00 | 22.77 | 22.77 | 0.00 |
| 16 | 33.52 | 1.39 | 99.00 | 22.77 | 22.77 | 0.00 |
| 17 | 38.14 | 1.58 | 99.00 | 22.77 | 22.77 | 0.00 |
| 18 | 39.53 | 1.64 | 99.00 | 22.77 | 22.77 | 0.00 |
| 19 | 40.59 | 1.68 | 99.00 | 22.77 | 22.77 | 0.00 |
| 20 | 41.42 | 1.72 | 99.00 | 22.77 | 22.77 | 0.00 |
| 21 | 42.55 | 1.76 | 99.00 | 22.77 | 22.77 | 0.00 |

TABLE 3-continued

Zone boundary calculations

| Zone # | Target NRZ freq | Freq ratio | Actual radius | Allowed ir | or | Zone angle |
|---|---|---|---|---|---|---|
| 22 | 44.21 | 1.83 | 99.00 | 22.77 | 22.77 | 0.00 |
| 23 | 45.82 | 1.90 | 99.00 | 22.77 | 22.77 | 0.00 |

It will be noted from FIG. 11 and Tables 1 and 2 above that the zones selected for recording data are from 2 through 12, where the NRZ frequency ranges from 17.17 Mhz to 28.16 Mhz.

For a better performing head, a group of zones would be selected having higher recording frequencies (NRZ frequencies). For example, using head HD #4 (FIG. 5A) which has better performance characteristics than HD #1 (FIG. 5A) permits the use of zones 10–20, the layout of which is different than that shown in FIG. 11, however the process for establishing the zones and their boundaries follows the same technique described above. With regard to a higher performance head, Table 4 below indicates the group of zones (10–20) which may be used for the higher performance head.

TABLE 4

TARGET ZONE SIZES

| Zone: # | Sectors/Track | Tracks | Sectors/Zone |
|---|---|---|---|
| 0 | 35 | 0.0 | 0 |
| 1 | 37 | 0.0 | 0 |
| 2 | 41 | 0.0 | 0 |
| 3 | 44 | 0.0 | 0 |
| 4 | 47 | 0.0 | 0 |
| 5 | 49 | 0.0 | 0 |
| 6 | 51 | 0.0 | 0 |
| 7 | 55 | 0.0 | 0 |
| 8 | 57 | 0.0 | 0 |
| 9 | 59 | 0.0 | 0 |
| 10 | 62 | 80.9 | 5017 |
| 11 | 64 | 35.7 | 2288 |
| 12 | 66 | 85.8 | 5666 |
| 13 | 69 | 63.4 | 4375 |
| 14 | 71 | 120.0 | 8519 |
| 15 | 74 | 129.5 | 9586 |
| 16 | 83 | 442.7 | 36745 |
| 17 | 89 | 166.3 | 14797 |
| 18 | 92 | 145.3 | 13370 |
| 19 | 95 | 130.5 | 12399 |
| 20 | 97 | 93.3 | 9045 |
| 21 | 99 | 0.0 | 0 |
| 22 | 104 | 0.0 | 0 |
| 23 | 107 | 0.0 | 0 |
| Total sectors | | | 121808 |
| Surplus sectors | | | — |

Table 5 below indicates the adjustments made to convert from the calculated tracks to the actual tracks to an integer based on the number of sectors and the zones selected for use, shown in Table 4 above.

TABLE 5

ROUNDING ADJUSTMENT

| Sectors/track | Tracks: calc'd | Tracks | Sectors/zone |
|---|---|---|---|
| 35 | 0.0 | 0 | 0 |
| 37 | 0.0 | 0 | 0 |
| 41 | 0.0 | 0 | 0 |
| 44 | 0.0 | 0 | 0 |
| 47 | 0.0 | 0 | 0 |
| 49 | 0.0 | 0 | 0 |
| 51 | 0.0 | 0 | 0 |
| 55 | 0.0 | 0 | 0 |
| 57 | 0.0 | 0 | 0 |
| 59 | 0.0 | 0 | 0 |
| 62 | 80.9 | 81 | 5022 |
| 64 | 35.7 | 36 | 2304 |
| 66 | 85.8 | 86 | 5676 |
| 69 | 63.4 | 63 | 4347 |
| 71 | 120.0 | 120 | 8520 |
| 74 | 129.5 | 130 | 9620 |
| 83 | 422.7 | 443 | 36769 |
| 89 | 166.3 | 166 | 14774 |
| 92 | 145.3 | 145 | 13340 |
| 95 | 130.5 | 131 | 12445 |
| 97 | 93.3 | 93 | 9021 |
| 99 | 0.0 | 0 | 0 |
| 104 | 0.0 | 0 | 0 |
| 107 | 0.0 | 0 | 0 |
| Total sectors | | | 121838 |
| Sectors required: | | | 83469 |
| Surface surplus | | | 38369 |

The calculated zone boundaries for zone 10–20 are illustrated in Table 6 below.

TABLE 6

ZONE BOUNDARY CALCULATIONS

| Zone # | Target NRZ freq | Freq ratio | Actual radius | allowed ir | or | Zone angle |
|---|---|---|---|---|---|---|
| 0 | 15.33 | 0.44 | 8.57 | 12.80 | 12.80 | 0.00 |
| 1 | 16.29 | 0.47 | 8.90 | 12.80 | 12.80 | 0.00 |
| 2 | 17.17 | 0.49 | 9.21 | 12.80 | 12.80 | 0.00 |
| 3 | 19.20 | 0.55 | 9.94 | 12.80 | 12.80 | 0.00 |
| 4 | 20.32 | 0.58 | 10.36 | 12.80 | 12.80 | 0.00 |
| 5 | 21.21 | 0.61 | 10.69 | 12.80 | 12.80 | 0.00 |
| 6 | 22.22 | 0.64 | 11.09 | 12.80 | 12.80 | 0.00 |
| 7 | 23.23 | 6.67 | 11.49 | 12.80 | 12.80 | 0.00 |
| 8 | 24.65 | 0.71 | 12.07 | 12.80 | 12.80 | 0.00 |
| 9 | 25.31 | 0.73 | 12.34 | 12.80 | 12.80 | 0.00 |
| 10 | 26.26 | 0.75 | 12.75 | 12.80 | 13.35 | 1.17 |
| 11 | 27.63 | 0.79 | 13.35 | 13.35 | 13.60 | 0.52 |
| 12 | 28.16 | 0.81 | 13.60 | 13.60 | 14.18 | 1.24 |
| 13 | 29.41 | 0.84 | 14.18 | 14.18 | 14.61 | 0.92 |
| 14 | 30.30 | 0.87 | 14.61 | 14.61 | 15.43 | 1.73 |
| 15 | 31.90 | 0.91 | 15.43 | 15.43 | 16.30 | 1.87 |
| 16 | 33.52 | 0.96 | 16.30 | 16.30 | 19.26 | 6.39 |
| 17 | 38.14 | 1.09 | 19.26 | 19.26 | 20.36 | 2.40 |
| 18 | 39.53 | 1.13 | 20.36 | 20.36 | 21.31 | 2.10 |
| 19 | 40.59 | 1.16 | 21.31 | 21.31 | 22.17 | 1.89 |
| 20 | 41.42 | 1.19 | 22.17 | 22.17 | 22.77 | 1.35 |
| 21 | 42.55 | 1.22 | 23.55 | 22.77 | 22.77 | 0.00 |
| 22 | 44.21 | 1.27 | 27.67 | 22.77 | 22.77 | 0.00 |
| 23 | 45.82 | 1.31 | 99.00 | 22.17 | 22.77 | 0.00 |

Comparing the capacity of the first head-disk combination characterized and described above in to FIG. 11 and Tables 1, 2 and 3 with the second, higher performing head-disk combination, the calculations for which have been made and are illustrated in to Tables 4, 5 and 6, it will be noted that the higher performing head-disk combination provides a substantial increase in the amount of data which may be stored.

For example, comparing the total number of sectors for the first head illustrated in Table 1 with the total sectors available for the second, higher performing head, it will be noted that for the first head-disk combination the total number of available user sectors is 83,445, while for the second, higher performing head-disk combination the total number of available user sectors is 121,838. It will be appreciated that the variable zone layout of the present invention provides the ability to utilize a lesser performing head at lower read/write frequencies (which results in a somewhat less data storage) and make up for that loss of data storage by increasing the read/write frequencies of better performing heads to provide better margin or improved overall recording capacity.

Figure 14:
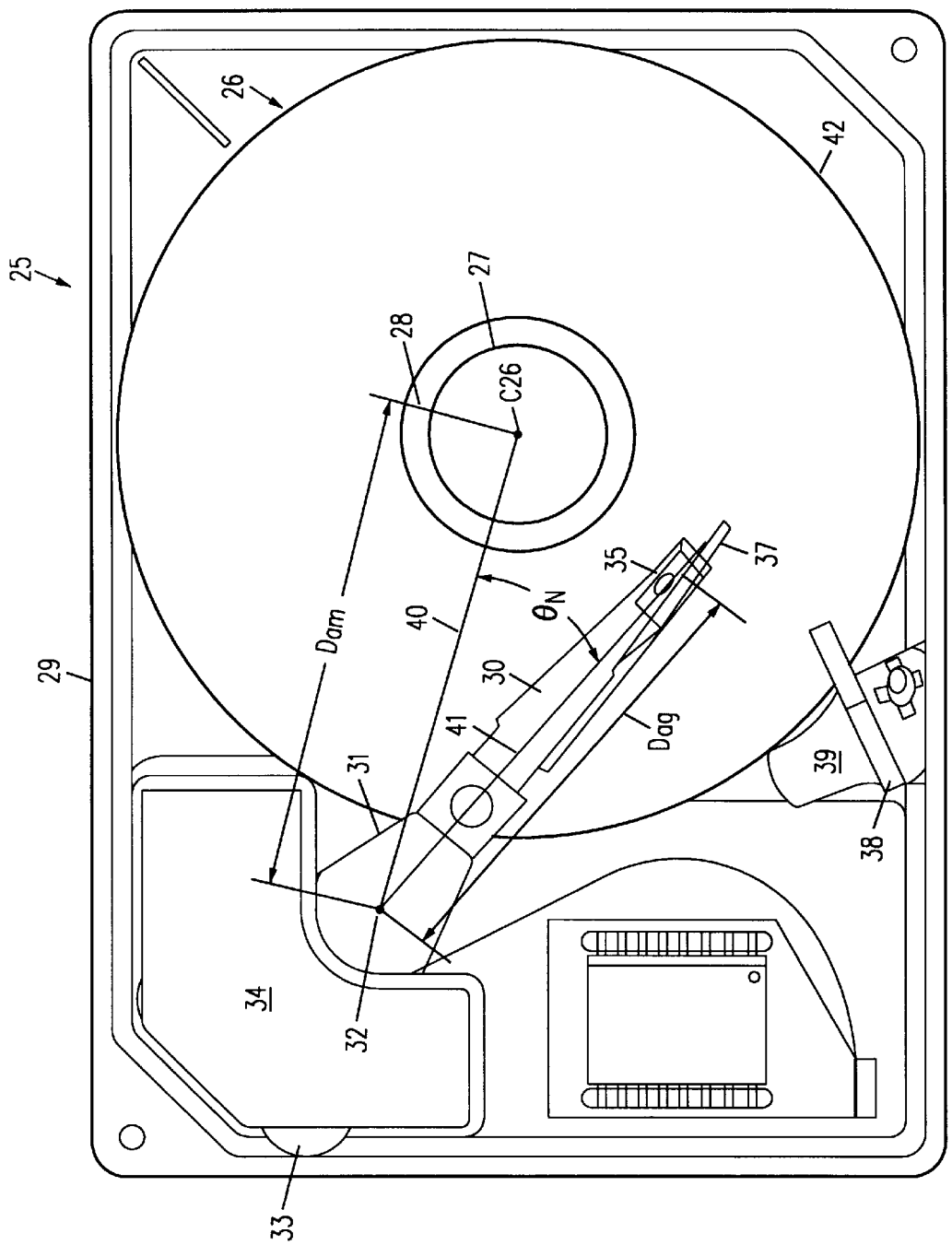
FIG. 14 is a top plan view of a disk drive including illustrative information for use in explaining variable zone layout in accordance with the present invention.

An example of the layout of zones using the adaptive zone process will be explained with the assistance of FIG. 14, which illustrates a top plan view of a dynamic head loading disk drive 25, in connection with the zone boundary flow chart of FIG. 13A and the formulas provided above as well as additional formulas which follows. Referring to FIG. 14, disk drive 25 includes a disk 26 which is supported on spindle 27 for rotation by a spin motor (not shown). A disk clamp 28 holds disk 26 in a fixed relationship with respect to a spindle 27. The center of spindle 27, and correspondingly center of disk for the purpose of radial calculations, is indicated by C26.

Disk 26 and the associated spin motor, rotary actuator and electronics are housed in housing indicated at 29. For the purpose of illustration, the cover which would normally be in place during use is not shown. As will be appreciated by those skilled in the art, disk drive 25 utilizes a rotary actuator having a load beam 30, and a body portion 31 which is supported for a rotation about a pivot point indicated at 32. The rotary actuator includes a coil 33, which in conjunction with flux plate assembly and magnet (indicated at 34) serves to position read/write transducer 35 above the surface of disk 26.

The rotary actuator of disk drive 25 utilizes a dynamic head loading mechanism which includes lift rod 37 which cooperates with cam surface 38 of cam assembly 39 to provide dynamic load and unload of read/write transducer 35. To provide an understanding of the adaptive zone layout of the present invention, definitional angles and distances are illustrated in FIG. 14. Line 40 indicates the distance between the pivot point 32 of the rotary actuator and the center of rotation C26 of disk 26. This distance is indicated on the drawing by "$D_{am}$". Line 41, which extends from pivot point 32 through the center of read/write transducer 35, illustrates the distance from pivot point 32 to the gap of the read/write transducer 35 (gap not shown). This distance is indicated in the drawing by "$D_{ag}$".

The rotary actuator, as illustrated in FIG. 14, is positioned between the inner radius (not shown since it is beneath clamp 28) of disk 26 and outer radius indicated at 42. For purposes of explanation, the rotary actuator in FIG. 14 is assumed to be positioned at the inner radius (ir) of a zone N the boundary of which is to be calculated. Angle $\theta_N$, the angle between lines 40 and 41, indicates the angle to track N. Since the disk drive of FIG. 14 is a dynamic head loading-type disk drive, the usable outer radius (or) is determined by the location at which lift tab 37 begins to raise read/write transducer 35 off of the surface of disk 26. Similarly, the usable inner radius (ir) is determined by the inner crash stop (not shown) which is located beneath the top plate of flux plate assembly 34.

The flow chart illustrated in FIG. 13A sets forth the steps which are taken to determine the zone boundaries for a head which has been characterized according to flow charts 12A and 12C. More particularly, in the overall drive assembly flow chart in FIG. 12A the step of layout of zones (block 1207) follows the testing of the assembled head disk assembly to determine the number of tracks available and measurement of the density capability of the read/write heads. Additionally, it may be desirable to set different read/write frequencies for each head-surface combination to achieve overall performance goals for the drive. The flow chart in FIG. 13A illustrates the detailed steps in the layout of zones. The steps described in FIG. 13A and in connection with the following description were used to arrive at the zone layout for head HD#1 as described above in connection with Tables 1–3.

Referring to FIG. 13A, in the first step indicated in block 1301 is to calculate the reference frequency, indicated $f_{Ref}$, which is the adjusted frequency used for the read/write transducer based on adjustment from the frequency $f_R$. It will be recalled from the above explanation of FIG. 5A that one method of determining the performance of a head at a typical operating frequency ($f_R$) is to use the log offtrack bit error rate (LOBER) technique of U.S. patent application Ser. No. 08/124,322, now U.S. Pat. No. 5,408,367 cited above. The head performance measurement and read/write frequency adjustment as appropriate is performed, for example, in block 1206 of FIG. 12A prior to zone layout. For example, referring to FIG. 5A and head HD#1, the adjusted operating frequency for head HD#1 is set at f1 which is our $f_{Ref}$ frequency which is about 24.12 Mhz. In this adjustment illustrated in FIG. 5A, this is approximately a density of 80% of the frequency nominal ($f_R$). Equation 7 below illustrates the computation of $f_{Ref}$.

$$f_{Ref} = f_R \text{ (Density Adjustment)} \qquad \text{(eq. 7)}$$

Next the calculation of the frequency ratios for each of the target zones is performed utilizing the target NRZ reference frequency (the target zone frequency illustrated in Table 3) for each of the zones), using the formula from equation 6 above which is repeated below.

$$\text{Frequency Ratio}_N = \frac{\text{Target Zone Freq}_N}{f_{Ref}} \qquad \text{(eq. 6)}$$

where: $f_{Ref}$ = adjusted read/write frequency

Target Zone $\text{Freq}_N$ =

NRZ frequency based on Target Zone Table

The result of the frequency ratio calculation provides the information included in the frequency ratio column of Table 3. After completion of the step in block 1302, the calculation of allowable inner radius (ir) for each target zone is accomplished using the regression formula of equation 5 above. The inner radius equation for use in step of block 1303 is indicated below as equation 8, which is equation 5 solved for inner radius (ir).

$$ir = \frac{-b + \sqrt{b^2 - (4)(a)(C - \text{FrequencyRatio}_N)}}{2a} \qquad \text{(eq. 8)}$$

Using the formula of equation 8, the inner radius ir is calculated for each of the zones. The information resulting from these calculations is included in the actual radius column of Table 3, for example.

Next, the step in block 1304 of FIG. 13A is performed, the calculation of the outer radius (or) for each target zone. As will be appreciated by, among other things, reference to FIG.

11, since the outer radius of one zone is equal to the inner radius of the next highest zone, then the outer radius N of a zone is equal to the inner radius of the succeeding zone, for example as indicated in equation 9.

$$or_N = ir_{N+1} \quad \text{(eq. 9)}$$

The calculated inner radius and outer radius may exceed the usable inner and outer radii based on the restrictions of crash stops and/or dynamic head loading considerations, and therefore the allowed inner and outer radii may have to be adjusted since it may not be possible to use the actual radius. This step is illustrated in block 1305 and it will be appreciated by reference to Table 3 that in the drive under consideration the minimum inner radius is 12.80 mm and the maximum outer radius is 22.77 mm. Comparing Table 3 with Table 1, it will be noted that in this example target zones 2–12 are used, thus the zone boundaries range from the allowable inner radius 12.80 mm for zone 2 to a maximum outer radius of 22.77 mm for zone 12. Mathematically, this relationship may be expressed as if radius$_N$>maximum radius, then radius$_N$=maximum radius; and if radius$_N$ is <minimum radius, then radius$_N$ is equal to minimum radius.

The final steps in the zone layout are the conversion of radii to track numbers (block 1306). In converting the radii to track numbers, the computation of the $\theta_N$ (FIG. 14), the angle to the track N, the following equation is utilized:

$$\theta_N = \cos^{-1}\left(\frac{D_{am}^2 + D_{ag}^2 - r_N^2}{2(D_{am})(D_{ag})}\right) - \theta_{ref} \quad \text{(eq. 10)}$$

The angle $\theta_{ref}$ is the angle between line 40 in FIG. 14 and line 41 when the gap of read/write transducer 35 is positioned over the track where reference measurements were made for characterizing the head. Next, the track number is determined utilizing equation 11 below.

Track Number (Rounded to integer value)=   (eq. 11)

Track$_{ref}$-($\theta_N$) (Rad/Track)

where:

$D_{am}$ and $D_{ag}$ are the distances illustrated in FIG. 14

$\theta_{ref}$ is as defined above track$_{ref}$ is the track number at angle $\theta_{ref}$ Rad/Track=track spacing in radians Using the above it will be readily appreciated how the zone layout is accomplished for each head-disk combination.

Performance of the above steps provides the inner and outer radii for each of the zones to be utilized with the head-surface combination. For example, referring to Tables 1–3 where it was determined that zones 2–12 would be utilized, the allowed inner radius for zone 2 is 12.80 mm, and the allowed outer radius is 13.42 mm. After all of the zone boundaries have been determined, the zone boundary data and the corresponding frequency for the tracks in the zones are recorded in non-volatile memory of the disk drive (block 1307), thus providing a lookup table for each head surface combination. It will be recalled that in FIG. 7 two head surface combinations were illustrated in the lookup table provided for those two head-surface combinations. In the final step (block 1308), the surface is formatted to provide the data zone structure determined for that surface based on the preceding steps.

Figure 4A:
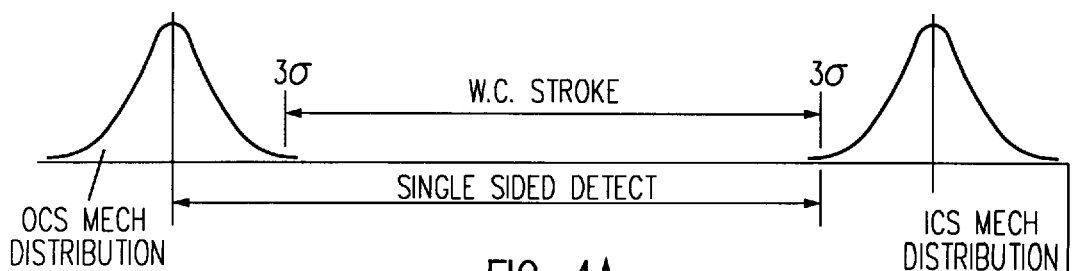
FIG. 4A is a graphical illustration of prior art stroke design criteria.
Figure 4B:
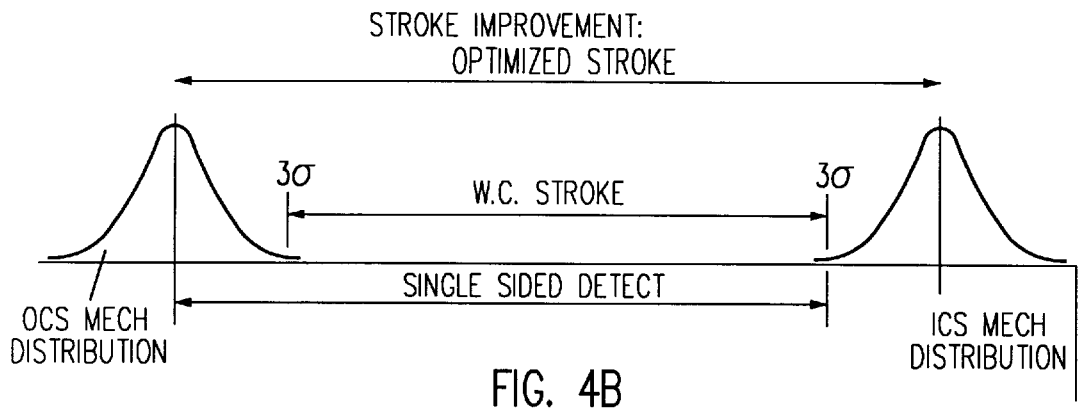
FIG. 4B illustrates graphically the stroke improvement used in the present invention.
Figure 10:
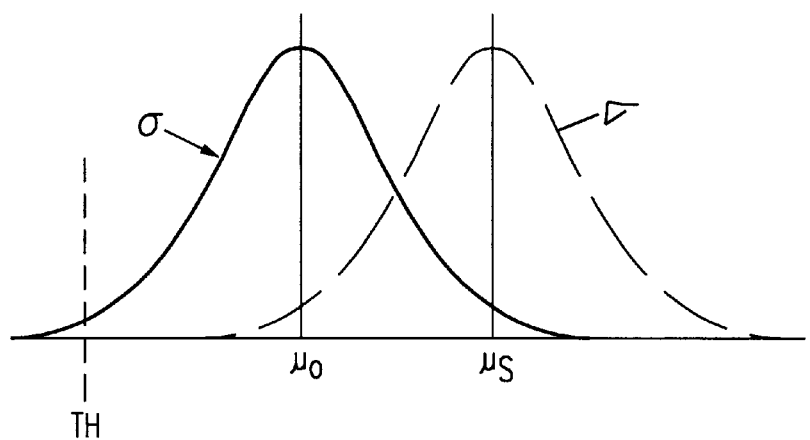
FIG. 10 illustrates two distribution curves, one for head performance of magnetic heads based on nominal stroke and the other performance with improved stroke.

According to another aspect of the present invention, improved recording density is achieved by optimizing the available stroke on a drive-by-drive basis. In the prior art as described above, and discussed with regard to a FIG. 4A, a predetermined number of tracks was established at the drive design stage and if after assembly of a drive the minimum number of tracks was not available, for reasons such as variation in a stroke from outer crash stop to inner crash stop, then the drive failed and could not be shipped. In accordance with the present invention, the drive is characterized and evaluated utilizing a process in which the heads are moved to the inner crash stop and the track number is recorded, then they are moved across the disk surface to the outer crash stop (or ramp structure) where that track number is also recorded. With this information the actual number of available tracks can be ascertained and are used. By optimizing the stroke so that all tracks can be used, the longer stroke results in a lower average linear recording density. Having a lower average linear density reduces the read/write frequency required for the read/write heads to achieve a predetermined storage capacity. Since the heads can operate at a lower read/write frequency than otherwise would be required if the longer stroke were not available, the lower read/write frequency results in improved bit error rate. The reduced read/write frequency moves all heads back up the LOBER curve and this adds to the margin. The distribution curve remains the same shape (i.e. the same number of high performers, average performers, and low performers are the same) but the mean moves. For example, referring to FIG. 10, the solid distribution curve indicates the performance at the shorter stroke, go indicating the original mean performance at that shorter stroke period. The dashed-line performance curve is the new curve for the optimized stroke, $\mu_s$ indicating the mean. The sigmas are the same, however the number of failures below the threshold TH is greatly reduced. Thus by using the optimized stroke with the variable zone layout described above, increased recording density is available even though in the plurality of heads used for a drive one or more heads perform at a level below a TH.

It will be recalled from above that in the prior art if the position variance of both the inner and outer crash stop is $\sigma^2$, then the average position lost on drives where all tracks are written before the crash stop positions are detected is 6$\sigma$. Other prior art drives detect one crash stop then write tracks until the second crash stop is detected. The average position lost on this type of drive is $$\frac{3\sigma}{\sqrt{2}}.$$

On a drive in accordance with the present invention where the density is varied to give a fixed capacity using all available tracks, the average position loss is zero. If $\sigma$=0.03 (Trks), where Trks=average number of tracks on the drive, then the average density gain is 6.4% compared to a prior art drive.

Thus it can be appreciated that with use of the longer stroke made available in accordance with the invention, a significant gain in storage density of the drive can be obtained.

One of the advantages of the present invention is that a series of disk drives may be produced using common head disk assemblies and drive electronics, that is made from a predetermined set of components, with each drive in the series exhibiting common characteristics, such as storage capacity, even though some of the components, such as heads or media, in the drives do not meet some minimum standards of performance. For example, as illustrated above, one head-media combination may be sufficiently better than another to permit obtaining a storage capacity goal by better utilizing the capacity of a higher performing head-media combination to overcome the deficiencies of the lower performing head-media combination. Since the zone boundary layouts and the recording frequencies used within the zones are established based on performance criteria and the ability of the head media combination to perform, there will be differences in the zone boundary patterns for disks from drive to drive in the series of drives.

Using the adaptive zone technique described herein permits the more efficient utilization of drive components and a better yield since from a like set of components drives of equal capacity may be produced although their internal head disk performances on a corresponding surface to surface basis will vary. For example, in one drive of the series the top surface of a disk may have a very different zone boundary layout and utilize a different band of frequencies than another drive in the series, although they were both made from a common set of head disk assembly components and drive electronics. Also, within each drive of the series the zone boundary patterns and frequency layouts may differ between upper and lower surfaces of a disk within a drive, for example as illustrated in FIG. 6. The ability to tailor the head-surface performance characteristics as described herein gives a manufacturer great flexibility in producing disk drives from components which inevitably vary in performance, since the ultimate goal is to provide to the user a storage characteristics established for the series, and it is not required that each drive in the series be internally, from a head-disk recording zone layout standpoint, the same.

A drive in accordance with the present invention may be constructed utilizing drive electronics such as those illustrated in U.S. Pat. No. 5,321,560 described above, along with a head disk assembly of the type described in the patent applications cited in the following paragraph.

It will be appreciated by those skilled in the art that the present invention can be utilized in disk storage devices using either the well-known rotary actuator or a drive which utilizes a linear actuator. As to the former category, the present invention may be employed in a rotary actuator disk drive such as that described in U.S. Pat. No. 5,469,314 issued Nov. 21, 1995, which is a division of U.S. patent application Ser. No. 07/629,948, filed Dec. 19, 1990, now abandoned, entitled "Miniature Hard Disk Drive for Portable Computer" by James Morehouse et al., which is incorporated herein by reference in its entirety, or in a rotary actuator disk drive such as that disclosed in U.S. patent application Ser. No. 07/766,480, filed Sep. 25, 1991 now U.S. Pat. No. 5,379,171 by James H. Morehouse, et al. entitled "Microminiature Hard Disk Drive" which is incorporated herein by reference in its entirety. Additionally, the present invention may be used with disk drives of both the dynamic head loading and contact start stop types.

Several embodiments of the present invention are illustrated above, however the invention may be practiced by making various modifications to the embodiments described without departing from the spirit and scope of the invention.

We claim:

1. A method of increasing recording density of data to be stored on a rotatable disk having first and second magnetic surfaces, wherein a first read/write transducer is associated with the first magnetic surface and a second read/write transducer is associated with the second surface, said method comprising the steps of:

(a) determining an actual track width of said first and second read/write transducers;

(b) comparing the actual track width of said first and second read/write transducers to determine if the actual track width of one of said first and second read/write transducers is greater than the actual track width of the other; and (c) if the actual track width of one of said first and second read/write transducers is greater than the actual track width of the other of said first and second read/write transducers, establishing a track pitch to be used for said first and second read/write transducers using the greater actual track width.

2. The method of claim 1, wherein the actual track width of said first read/write transducer in step (a) is determined by the method comprising the steps of:

(d) writing a test pattern with said first read/write transducer at a location t on said first magnetic surface;

(e) reading said test pattern and measuring an amplitude of the signal;

(f) moving said first read/write transducer in a first radial direction to a position a distance d from said location t and writing a DC erase signal;

(g) moving said first read/write transducer in a second radial direction, opposite said first radial direction, to a position a distance d from said location t and writing a DC erase signal;

(h) reading said test pattern at location t, measuring an amplitude of the signal and comparing the amplitude of the signal with the amplitude of the signal measured in step (e); and (i) determining the actual track width of said first read/write transducer as a function of the signal amplitudes measured in steps (e) and (h).

3. A method of increasing recording density of data to be stored on a rotatable disk having first and second magnetic surfaces, wherein a first read/write transducer is associated with the first magnetic surface and a second read/write transducer is associated with the second surface, said data being stored as data pulses recorded at various read/write frequencies, said method comprising the steps of:

(a) selecting a minimum acceptable error rate value for said first and second transducers operating at a first read/write frequency;

(b) positioning said first transducer in operative relationship with said first surface and determining an error rate value of said first transducer at said first read/write frequency;

(c) positioning said second transducer in operative relationship with said second surface and determining an error rate value of said second transducer at said first read/write frequency;

(d) comparing the error rate values determines in steps (b) and (c) with said minimum acceptable error rate value and if the error rate value of one of said first and second transducers is below said minimum acceptable error rate value and the error rate value of the other of said first and second transducers is above said minimum acceptable error rate value, reducing the read/write operating frequency of the transducer having an error rate value below said minimum acceptable error rate value by an amount sufficient to cause said transducer to perform at least to said minimum acceptable error rate value and increasing the read/write operating frequency of the other of said transducers;

(e) determining an actual track width of said first and said second read/write transducers;

(f) comparing the actual track width of said first and second read/write transducers to determine if the actual track width of one of said first and second read/write transducer is greater than the actual track width of the other; and (g) if the actual track width of one of said first and second read/write transducers is greater than the actual track width of the other at said first and second read/write transducers, establishing a track pitch to be used for said first and second read/write transducers using the greater actual track width.

4. The method of claim 3, wherein said disk has N accessible tracks, and further wherein said steps (b) and (c) are performed at track N÷2.

5. The method of claim 3, further comprising the step of:

(h) determining the average error rate value of said first and second transducers at said first read/write frequency; and wherein in step (d) the read/write operating frequency of the transducers is changed to an operating frequency where both operate at said average error rate value.

6. A method of defining a plurality of zones each having a read/write frequency for recording on and playback of information from a magnetic medium using a read/write transducer, and establishing a number of tracks for each of said plurality of zones, the method comprising the steps of:

(a) writing a test pattern with said read/write transducer at a location t on a surface of said magnetic medium;

(b) reading said test pattern and measuring an amplitude of the signal;

(c) moving said read/write transducer in a first radial direction to a position a distance d from said location t and writing a DC erase signal;

(d) moving said read/write transducer in a second radial direction, opposite said first radial direction to a position a distance d from said location t and writing a DC erase signal;

(e) reading said test pattern at location t, measuring an amplitude of the signal, and comparing the amplitude of the signal with the amplitude of the signal measured in step (b);

(f) determining an actual track width of the read/write transducer as a function of the signal amplitudes measured in steps (b) and (e);

(g) moving the medium with respect to the read/write transducer and reading data from said medium;

(h) measuring a recording performance of the read/write transducer;

(i) selecting a group of read/write frequencies, one frequency for each zone, based on the measured recording performance of the read/write transducer;

(j) defining the boundaries of each zone based on the frequency selected for the zone; and (k) establishing a number of tracks for each zone as a function of the track width determined in step (f).

7. The method according to claim 6, wherein in step (h) the measuring is performed at one location.

8. The method of claim 6, wherein in step (h) the measuring is performed at a plurality of locations.

9. A method of determining a width of a signal recorded by a read/write transducer on a surface of a magnetic medium, the method comprising the steps of:

(a) writing a test pattern with said read/write transducer at a location t on a surface of said magnetic medium;

(b) reading said test pattern and measuring an amplitude of the signal;

(c) moving said read/write transducer in a first radial direction to a position a distance d from said location t and writing a DC erase signal;

(d) moving said read/write transducer in a second radial direction, opposite said first radial direction, to a position a distance d from said location t and writing DC erase signal;

(e) reading said test pattern at location t, measuring an amplitude of the signal, and comparing the amplitude of the signal with the amplitude of the signal measured in step (b);

(f) determining an actual track width of the read/write transducer as a function of the signal amplitudes measured in steps (b) and (e).

10. The method according to claim 9, wherein in step (a) an electrical signal is applied to said read/write transducer to provide said test pattern with a frequency in a range of recording frequencies for which the read/write transducer is to be used.

11. The method according to claim 9, wherein the test pattern has a constant frequency.

12. The method according to claim 9, wherein the distance d is selected to be a minimum width expected for a pattern recorded by said read/write transducer.

13. The method according to claim 9, wherein said method is performed in an assembly process for a disk drive, wherein said surface of said magnetic medium in the disk drive includes a plurality of zones, each zone having a read/write frequency, and wherein in step (a) an electrical signal is applied to said read/write transducer to provide said test pattern with a frequency equal to the highest frequency to be used in the disk drive.

* * * * *